(12) United States Patent
Islam et al.

(10) Patent No.: US 12,445,908 B2
(45) Date of Patent: Oct. 14, 2025

(54) SELECTION OF DIFFERENT INITIAL BANDWIDTH PARTS FOR REDUCED CAPABILITY USER EQUIPMENT

(71) Applicant: QUALCOMM Incorporated, San Diego, CA (US)

(72) Inventors: Muhammad Nazmul Islam, Littleton, MA (US); Jing Lei, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 17/820,371

(22) Filed: Aug. 17, 2022

(65) Prior Publication Data

US 2023/0054786 A1 Feb. 23, 2023

Related U.S. Application Data

(60) Provisional application No. 63/234,966, filed on Aug. 19, 2021.

(51) Int. Cl.
*H04W 24/00* (2009.01)
*H04B 17/309* (2015.01)
(Continued)

(52) U.S. Cl.
CPC .......... *H04W 28/20* (2013.01); *H04B 17/309* (2015.01); *H04W 68/00* (2013.01); *H04L 5/16* (2013.01)

(58) Field of Classification Search
CPC .... H04W 28/20; H04W 68/00; H04B 17/309; H04L 5/16
(Continued)

(56) References Cited

U.S. PATENT DOCUMENTS 11,375,518 B2 * 6/2022 Lin ...................... H04W 76/28
11,622,350 B2 * 4/2023 Tooher .............. H04W 72/0453
370/329
(Continued)

OTHER PUBLICATIONS

3GPP TSG RAN2: "Reply LS on Network Sharing with Multiple SSBs in a Carrier", 3GPP TSG-SA5 Meeting #138-e, S5-214020, 3rd Generation Partnership Project, Mobile Competence Centre, 650, Route Des Lucioles, F-06921 Sophia-Antipolis Cedex, France vol. SA WG5, No. e-meeting, 20210823-20210831, Jul. 16, 2021, 3 Pages, XP052031519, Section 1, p. 1.
(Continued)

*Primary Examiner* — Marceau Milord
(74) *Attorney, Agent, or Firm* — Arent Fox, LLP

(57) ABSTRACT

This disclosure provides systems, methods and apparatus, including computer programs encoded on computer storage media for a reduced capability (RedCap) user equipment (UE) and supporting cell. The RedCap UE is configured with multiple bandwidth parts (BWPs). A maximum bandwidth of the RedCap UE is lower than a maximum bandwidth of a non-RedCap UEs. The UE receives a cell-defining synchronization signal block (CD-SSB) that defines a shared initial downlink BWP for RedCap UEs and non-RedCap UEs. The UE switches to a separate initial downlink BWP for RedCap UEs. The UE accesses the cell via the separate initial downlink BWP. The UE receives a configuration of an active downlink BWP for RedCap UEs. The UE determines whether to switch from the active downlink BWP to the shared initial BWP or the separate initial downlink BWP to obtain information such as updated system information, system measurements, and uplink configuration information.

30 Claims, 13 Drawing Sheets

(51) Int. Cl.
*H04W 28/20* (2009.01)
*H04W 68/00* (2009.01)
*H04L 5/16* (2006.01)

(58) Field of Classification Search
USPC .......................................................... 455/423
See application file for complete search history.

(56) References Cited

U.S. PATENT DOCUMENTS

| | | | | |
|---|---|---|---|---|
| 11,677,524 | B2* | 6/2023 | Duan | H04L 5/0048 370/330 |
| 11,729,761 | B2* | 8/2023 | Abedini | H04W 72/0453 370/329 |
| 11,832,268 | B2* | 11/2023 | Yang | H04W 72/23 |
| 11,870,734 | B2* | 1/2024 | Abotabl | H04L 5/0048 |
| 11,877,242 | B2* | 1/2024 | Li | H04W 52/0212 |
| 11,990,993 | B2* | 5/2024 | Xu | H04L 5/0094 |
| 11,997,664 | B2* | 5/2024 | Bai | H04B 7/0413 |
| 12,004,157 | B2* | 6/2024 | Li | H04W 72/1273 |
| 12,089,220 | B2* | 9/2024 | Zhou | H04W 52/0206 |
| 12,101,842 | B2* | 9/2024 | Li | H04W 76/28 |
| 2018/0192383 | A1* | 7/2018 | Nam | H04L 5/0053 |
| 2019/0150142 | A1* | 5/2019 | Huang | H04L 5/0094 370/336 |
| 2020/0029316 | A1* | 1/2020 | Zhou | H04W 74/0833 |
| 2020/0236692 | A1* | 7/2020 | Lin | H04W 72/535 |
| 2020/0313833 | A1* | 10/2020 | Yi | H04L 5/001 |
| 2021/0143954 | A1* | 5/2021 | Duan | H04W 52/0216 |
| 2021/0160842 | A1* | 5/2021 | Bai | H04W 72/046 |
| 2021/0234604 | A1* | 7/2021 | Raghavan | H04B 7/0456 |
| 2021/0360674 | A1* | 11/2021 | Lim | H04W 52/0216 |
| 2021/0368448 | A1* | 11/2021 | Li | H04W 52/0235 |
| 2022/0006599 | A1* | 1/2022 | Wang | H04L 27/26025 |
| 2022/0124765 | A1* | 4/2022 | Li | H04W 52/0216 |
| 2022/0141862 | A1* | 5/2022 | Bai | H04B 7/088 370/329 |
| 2022/0417911 | A1* | 12/2022 | Kwak | H04L 5/0053 |
| 2022/0418001 | A1* | 12/2022 | Chien | H04W 74/0833 |
| 2023/0007672 | A1* | 1/2023 | Abedini | H04W 72/1263 |
| 2023/0074775 | A1* | 3/2023 | Lei | H04W 72/044 |
| 2023/0239848 | A1* | 7/2023 | Tooher | H04W 24/08 370/329 |
| 2023/0269712 | A1* | 8/2023 | He | H04L 5/001 370/329 |
| 2023/0269758 | A1* | 8/2023 | Wu | H04W 72/23 370/312 |
| 2023/0396393 | A1* | 12/2023 | Yao | H04B 7/0695 |
| 2023/0403695 | A1* | 12/2023 | Abedini | H04B 7/088 |
| 2024/0080821 | A1* | 3/2024 | Jan | H04W 48/12 |
| 2024/0089921 | A1* | 3/2024 | Ma | H04L 5/0053 |
| 2024/0137909 | A1* | 4/2024 | Liu | H04W 68/005 |

OTHER PUBLICATIONS

Apple Inc: "Reduced Maximum UE Bandwidth for Redcap", 3GPP TSG-RAN WG1 #106-e, R1-2107745, 3rd Generation Partnership Project, Mobile Competence Centre, 650, Route Des Lucioles, F-06921 Sophia-Antipolis Cedex, France vol. RAN WG1, No. e-Meeting, 20210816-20210827, Aug. 7, 2021, 7 Pages, XP052038633, RAN1 #105 Agreements, p. 1-2 Section 2.1, p. 3 section 2.2, p. 3-5, Figure 2.

International Search Report and Written Opinion—PCT/US2022/075153—ISA/EPO—Nov. 28, 2022.

Lenovo, et al., "On UE Complexity Reduction Features for RedCap", 3GPP TSG RAN WG1 Meeting #102e, R1-2005830, 3rd Generation Partnership Project, Mobile Competence Centre, 650, Route Des Lucioles, F-06921 Sophia-Antipolis Cedex, France, vol. RAN WG1, No. E-meeting, 20200817-20200828, Aug. 7, 2020, 5 Pages, XP051915055, Opt.2 and Proposal 3, p. 3 Section 2.2, p. 3-4, 2.1 UE Bandwidth Reduction Figure 1 Table 1 Proposals 1-3, 3 Conclusions.

Qualcomm Incorporated: "BW Reduction for RedCap UE", 3GPP TSG-RAN WG1 Meeting #106, R1-2107351, 3rd Generation Partnership Project, Mobile Competence Centre, 650, Route Des Lucioles, F-06921 Sophia-Antipolis Cedex, France, vol. RAN WG1, No. e-Meeting, 20210816-20210827, Aug. 7, 2021, 24 Pages, XP052038299, Section 2.1, p. 1-2, Proposal 4, p. 4 Section 2.2, p. 6-7 Section 2.3, p. 8-9 Proposal.27, p. 20, Sections 1, 2.1.1, 2.2, 2.3, p. 1-10.

Mvo, et al., "Discussion on Reduced Maximum UE Bandwidth", 3GPP TSG RAN WG1 #106-e, R1-2106601, 3rd Generation Partnership Project, Mobile Competence Centre, 650, Route Des Lucioles, F-06921, Sophia-Antipolis Cedex, France, vol. RAN WG1, No. e-Meeting, 20210816-20210827, Aug. 7, 2021, 9 Pages, XP052037907, Section 1, p. 1-p. 2, Section 2.1, p. 2-p. 6, Figure 1, Table 1.

* cited by examiner

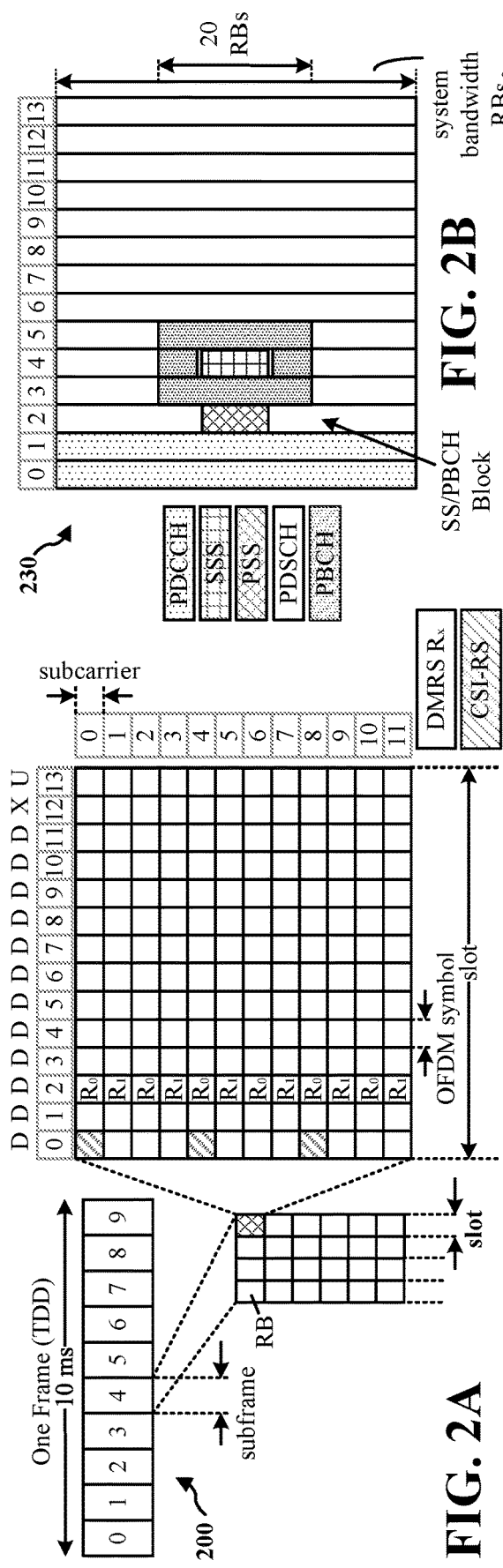
FIG. 2A
FIG. 2B
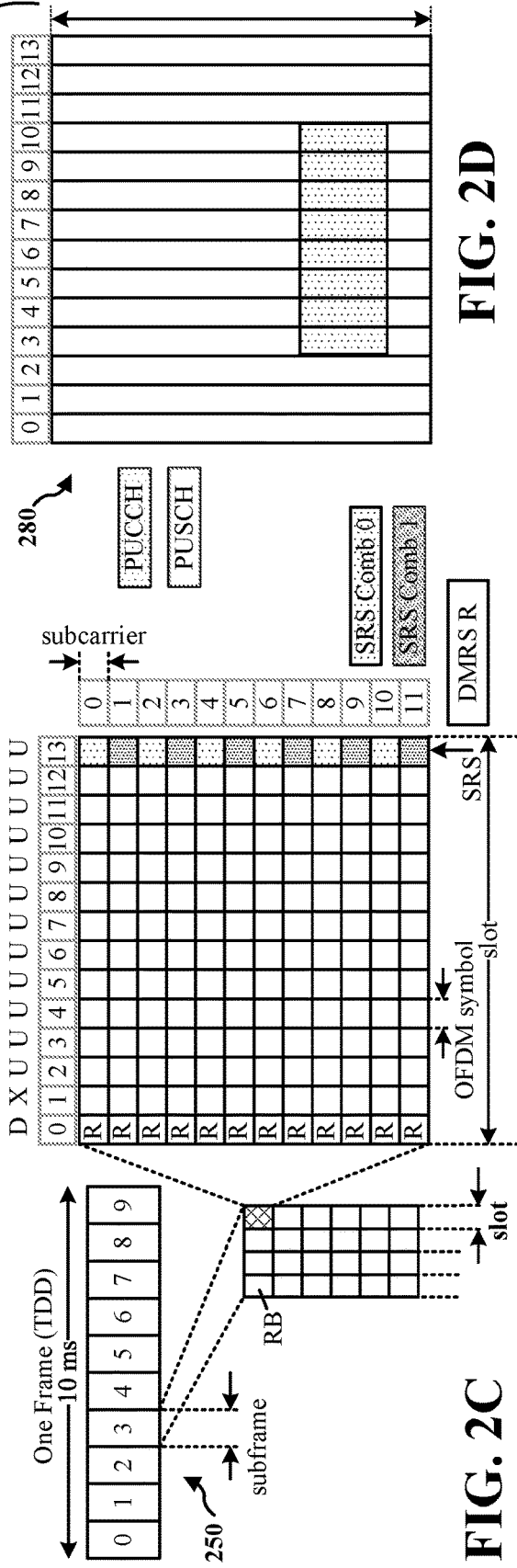
FIG. 2C
FIG. 2D

SELECTION OF DIFFERENT INITIAL BANDWIDTH PARTS FOR REDUCED CAPABILITY USER EQUIPMENT

CROSS REFERENCE TO RELATED APPLICATIONS

This application claims priority to U.S. Provisional Application No. 63/234,966 titled "SELECTION OF DIFFERENT INITIAL BANDWIDTH PARTS FOR REDUCED CAPABILITY USER EQUIPMENT," filed Aug. 19, 2021, which is assigned to the assignee hereof, and incorporated herein by reference in its entirety.

TECHNICAL FIELD

The present disclosure relates to wireless communications including selection of different initial bandwidth parts for reduced capability user equipment.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for obtaining information at a reduced capability user equipment (RedCap UE). The method includes receiving a cell-defining synchronization signal block (CD-SSB) that defines a shared initial downlink bandwidth part (BWP) for RedCap UEs and non-RedCap UEs. The method includes switching to a separate initial downlink BWP for RedCap UEs. The method includes accessing a cell via the separate initial downlink BWP. The method includes receiving a configuration of an active downlink BWP for RedCap UEs. The method includes determining whether to switch from the active downlink BWP to the shared initial BWP or the separate initial downlink BWP to obtain information.

In another innovative aspect, the disclosure provides a method of initiating a random access procedure. The method includes receiving, at a reduced capability user equipment (RedCap UE), a cell-defining synchronization signal block (CD-SSB) that defines a shared initial downlink bandwidth part (BWP) for RedCap UEs and non-RedCap UEs. The method includes receiving, at the RedCap UE, a non-CD-SSB for a separate initial downlink BWP for RedCap UEs. The method includes selecting one of the CD-SSB or the non-CD-SSB for transmitting a random access message based on system information received on the shared initial BWP or the separate initial BWP.

In another innovative aspect, the disclosure provides a method of configuring BWP-specific uplink parameters. The method includes receiving a cell-defining synchronization signal block (CD-SSB) that defines a shared initial downlink bandwidth part (BWP) for RedCap UEs and non-RedCap UEs. The method includes switching to a separate initial downlink BWP for RedCap UEs and an initial uplink BWP for RedCap UEs. The method includes receiving BWP specific uplink parameters for the initial uplink BWP for RedCap UEs or an active uplink BWP for RedCap UEs, wherein the initial uplink BWP for RedCap UEs and the active uplink BWP for RedCap UEs are configured at an edge of a carrier bandwidth.

The present disclosure also provides an apparatus (e.g., a UE) including a memory storing computer-executable instructions and at least one processor configured to execute the computer-executable instructions to perform at least one of the above methods, an apparatus including means for performing at least one of the above methods, and a non-transitory computer-readable medium storing computer-executable instructions for performing at least one of the above methods.

One innovative aspect of the subject matter described in this disclosure can be implemented in a method of supporting a RedCap UE (e.g., by a base station). The method includes transmitting a cell-defining synchronization signal block (CD-SSB) that defines a shared initial downlink bandwidth part (BWP) for RedCap UEs and non-RedCap UEs. The method includes transmitting a non-CD-SSB for a separate initial downlink BWP for RedCap UEs. The method includes configuring an active downlink BWP for the RedCap UE including a paging search space. The method includes transmitting a paging physical downlink control channel (PDCCH) indicating that system information has been updated. The method includes transmitting updated system information on the shared initial downlink BWP, the separate initial downlink BWP, or the active downlink BWP as indicated by the paging PDCCH.

In another innovative aspect, the disclosure provides method of supporting a RedCap UE with BWP-specific uplink parameters. The method includes transmitting a cell-defining synchronization signal block (CD-SSB) that defines a shared initial downlink bandwidth part (BWP) for RedCap UEs and non-RedCap UEs. The method includes transmitting a non-CD-SSB for a separate initial downlink BWP for RedCap UEs and an initial uplink BWP for RedCap UEs. The method includes transmitting BWP specific uplink parameters for the initial uplink BWP for RedCap UEs or an active uplink BWP for RedCap UEs, wherein the initial uplink BWP for RedCap UEs and the active uplink BWP for RedCap UEs are configured at an edge of a carrier bandwidth.

The present disclosure also provides an apparatus (e.g., a BS) including a memory storing computer-executable instructions and at least one processor configured to execute the computer-executable instructions to perform at least one of the above methods, an apparatus including means for performing at least one of the above methods, and a non-transitory computer-readable medium storing computer-executable instructions for performing at least one of the above methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a subframe.

Like reference numbers and designations in the various drawings indicate like elements.

DETAILED DESCRIPTION

Figure 1:
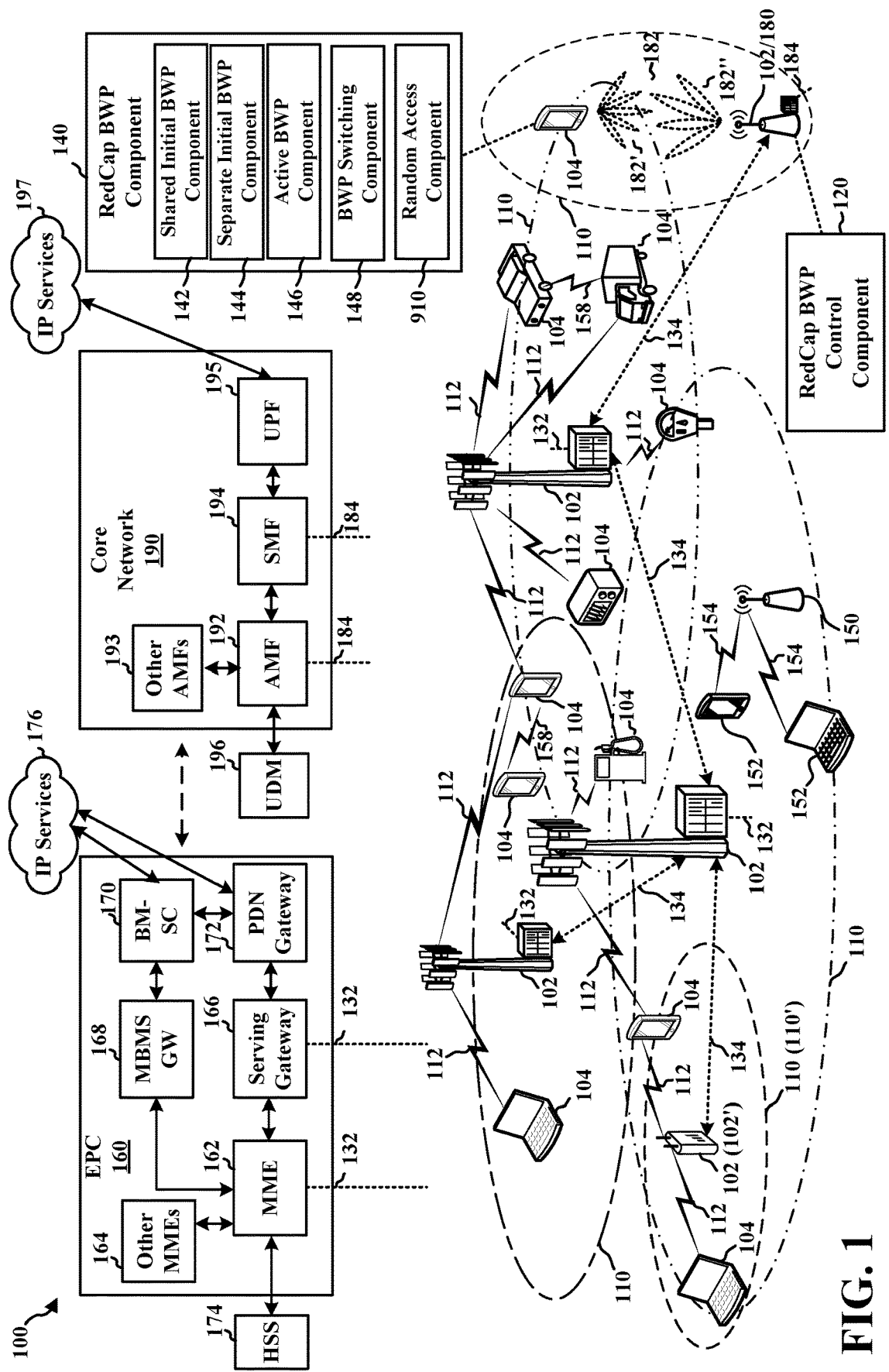
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) may utilize a subset of total cell bandwidth of a cell referred to as a Bandwidth Part (BWP). For example, in 5G NR releases 15 and 16, a maximum BWP size is 100 MHz. In higher frequency ranges (e.g., FR 2), the size of bandwidth parts may increase. Such large bandwidths may be designed to satisfy the demands of premium smartphones utilizing enhanced mobile broadband (eMBB) and other use cases such as ultra-reliable low latency communication (URLLC) and vehicle to anything (V2X). For some devices, referred to as reduced capability or RedCap devices, the maximum size of a BWP may be reduced to provide power saving and reduced complexity. That is, a first type of UE be capable of using a BWP of the maximum BWP size, whereas a RedCap UE may be a second type of UE that has lower maximum BWP size than the first type of UE for a frequency range. Example RedCap devices may include wearables, industrial wireless sensor networks (IWSN), surveillance cameras, and low-end smartphones. In some cases, data rates for RedCap devices may be achieved with BWP sizes less than 100 MHz. In an example implementation, in FR1, a maximum device bandwidth for a non-RedCap device may be 100 MHz, while the maximum device bandwidth for a RedCap device may be 20 MHz. In FR2, the maximum device bandwidth for a non-RedCap device may be 200 MHz, while the maximum device bandwidth for a RedCap device may be 100 MHz. Other maximum device bandwidths may be applicable in other implementations.

RedCap devices may coexist with non-RedCap devices on the same cells. The reduced bandwidth of RedCap devices may, however, may be incompatible with some system configurations. For example, a physical uplink control channel (PUCCH) is typically allocated at the edges of an uplink BWP to allow contiguous physical uplink shared channel (PUSCH) transmissions and random access channel (RACH) transmissions near the center of the uplink BWP. Broadcast signaling for initial access (e.g., channel raster and synchronization signal blocks (SSBs)) are typically transmitted near the middle of the downlink BWP. Accordingly, a RedCap UE with a reduced BWP size may not be able to transmit on the PUCCH and receive SSBs. One proposal to accommodate RedCap UEs is to provide a separate initial BWP for RedCap devices that carries downlink signaling. The separate initial BWP for RedCap devices may be located near the edge of carrier bandwidth such that the PUCCH resources overlap with the PUCCH resources for non-RedCap devices. In some proposals, an active BWP may also be configured for RedCap devices. Multiple BWPs may provide flexibility for RedCap devices, but raise additional issues for signaling. Broadly, a RedCap UE may monitor one BWP at a time, but signaling may occur on different BWPs. For example, paging for system information updates, system measurements, random access procedures, radio resource control (RRC) re-establishment and uplink configuration may be affected by presence of multiple BWPs.

In an aspect, the present disclosure provides for signaling using multiple BWPs for a RedCap UE. The RedCap UE may receive cell-defining SSBs (CD-SSBs) on a shared initial BWP that is applicable to both RedCap UEs and non-RedCap UEs. CD-SSBs refer to the set of SSBs that are located at SSB raster points. Hence, CD-SSBs can be detected by UEs that are performing initial access. The RedCap UE may receive non-CD SSBs on a separate initial BWP for RedCap UEs. Non-CD-SSBs are not located at raster points. The UE knows the location of the Non-CDSSBs only after being connected to the network (e.g., the shared initial BWP). The RedCap UE may additionally be configured with an active BWP for RedCap UEs. The RedCap UE may determine whether to switch from the active BWP to either the shared initial BWP or the separate initial BWP. For example, if the active BWP is configured with a paging search space, the RedCap UE may receive a paging physical downlink control channel (PDCCH) and determine whether to receive updated system information on the shared initial BWP, the separate initial BWP, or the active BWP. If the active BWP is not configured with a paging search space, the RedCap UE may periodically switch to the separate initial BWP to receive paging messages. Similarly, the configuration of the active BWP may indicate a measurement resource (e.g., for layer 3 measurements) on any of the shared initial BWP, the separate initial BWP, or the active BWP and measurement gaps on the active BWP. For example, the RedCap UE may measure both the CD-SSBs on the shared initial downlink BWP and the non-CD-SSBs on the separate initial downlink BWP. For fallback during RRC re-establishment or RRC release with redirection, a default initial downlink BWP may be standardized, or the network may indicate when the separate initial downlink BWP for RedCap UEs is available on neighbor cells.

For random access procedures, the system information may specify whether the RedCap UE is to use the CD-SSBs or the non-CD-SSBs for transmitting an initial random access message. The RedCap UE may use the CD-SSBs for a first transmission of the random access message and switch to the non-CD-SSBs if retransmission is necessary and there is time to measure the non-CD-SSBs before the retransmission. More generally, uplink transmission parameters may be BWP specific (e.g., different between an initial uplink BWP for RedCap UEs and an active initial uplink BWP for RedCap UEs). The RedCap UE may receive BWP-specific uplink parameters in a BWP configuration, BWP switching command, or system information update for RedCap UEs.

Particular implementations of the subject matter described in this disclosure can be implemented to realize one or more of the following potential advantages. RedCap devices may use a narrower bandwidth, which may save power, while co-existing on the same carrier bandwidth with non-RedCap UEs. The RedCap UEs may be configured with multiple BWPs and may switch BWPs to obtain information without interfering with operation of non-RedCap UEs.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 may include a RedCap BWP component 140 that manages multiple BWPs for a RedCap UE. The RedCap BWP component 140 may include a shared initial BWP component 142 configured to receive a CD-SSB that defines a shared initial BWP for RedCap UEs and non-RedCap UEs. The RedCap BWP component 140 may include a separate initial BWP component 144 configured to switch to a separate initial downlink BWP for RedCap UEs. For example, the separate initial BWP component 144 may be configured to receive a non-CD-SSB for a separate initial downlink BWP for RedCap UEs. The RedCap BWP component 140 may access a cell via the separate initial downlink BWP. The RedCap BWP component 140 may include an active BWP component 146 configured to receive a configuration of an active downlink BWP for RedCap UEs. The RedCap BWP component 140 may include a BWP switching component configured to determine whether to switch from the active downlink BWP to the shared initial BWP or the separate initial downlink BWP to obtain information. In some implementations, the RedCap BWP component 140 may include a random access component 910 configured to select one of the CD-SSB or the non-CD-SSB for transmitting a random access message based on system information received on the shared initial BWP or the separate initial BWP. In some implementations, the RedCap BWP component 140 may optionally include an uplink configuration component 920 (FIG. 9) configured to receive BWP specific uplink parameters for the initial uplink BWP for RedCap UEs or an active uplink BWP for RedCap UEs. The initial uplink BWP for RedCap UEs and the active uplink BWP for RedCap UEs may be configured at an edge of a carrier bandwidth.

Figure 8:
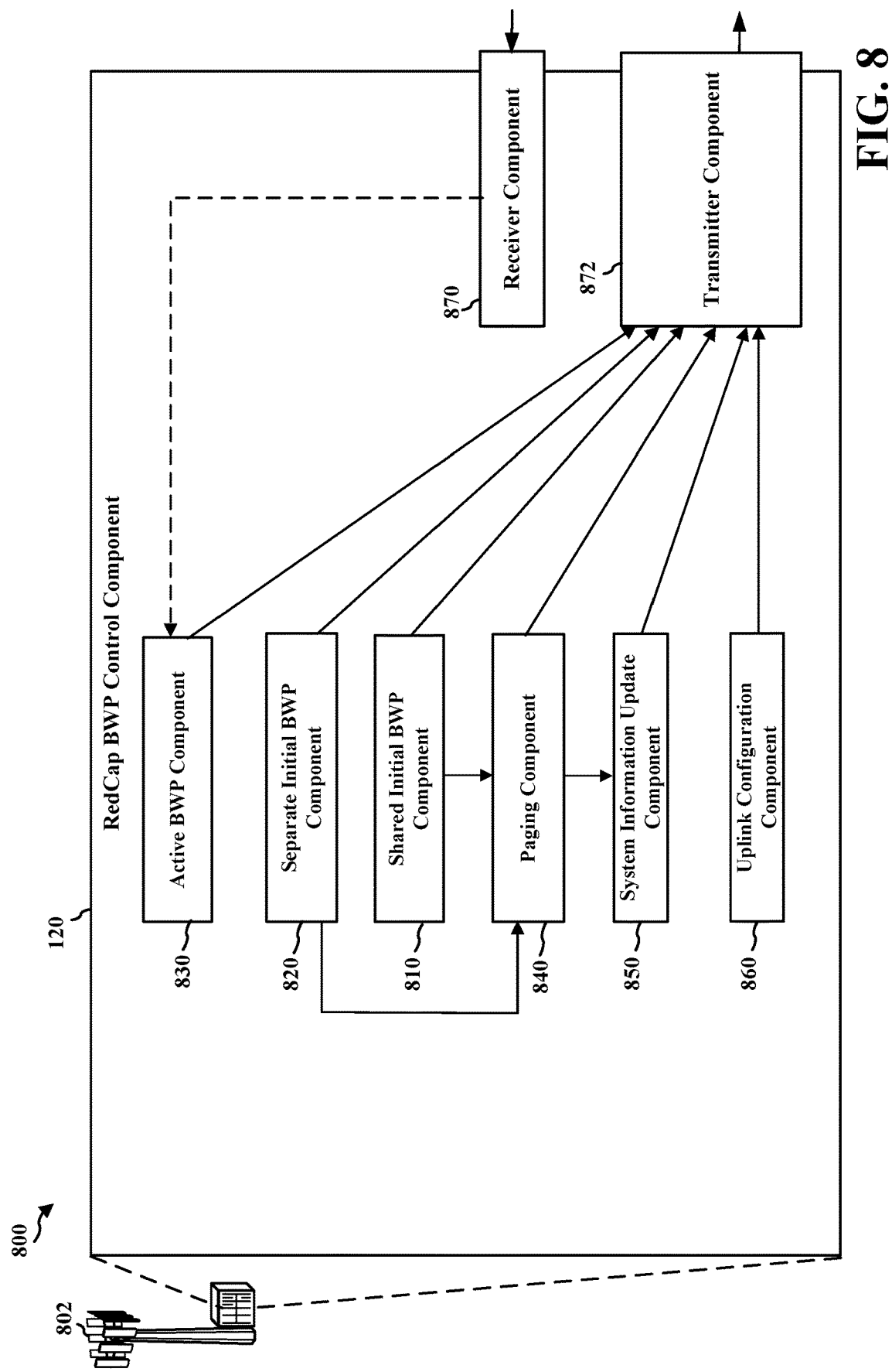
FIG. 8 is a conceptual data flow diagram illustrating the data flow between different means/components in an example BS.

In some implementations, one or more of the base stations 102 may include a RedCap BWP control component 120 configured to manage multiple BWPs for RedCap UEs. As illustrated in FIG. 8, the RedCap BWP control component 120 may include a shared initial BWP component 810 configured to transmit a CD-SSB that defines a shared initial BWP for RedCap UEs and non-RedCap UEs. The RedCap BWP control component 120 may include a separate initial BWP component 820 configured to transmit a non-CD-SSB for a separate initial downlink BWP for RedCap UEs. The RedCap BWP control component 120 may include an active BWP component 830 configured to configure an active downlink BWP for the RedCap UE including a paging search space. The RedCap BWP control component 120 may include a paging component 840 configured to transmit a paging PDCCH indicating that system information has been updated. The RedCap BWP control component 120 may include a system information update component 850 configured to transmit updated system information on the shared initial downlink BWP, the separate initial downlink BWP, or the active downlink BWP as indicated by the paging PDCCH. In some implementations, the RedCap BWP control component 120 may optionally include an uplink configuration component 860 configured to transmit BWP specific uplink parameters for the initial uplink BWP for RedCap UEs or an active uplink BWP for RedCap UEs. The initial uplink BWP for RedCap UEs and the active uplink BWP for RedCap UEs may be configured at an edge of a carrier bandwidth.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one. In an aspect, a narrow bandwidth part (NBWP) refers to a BWP having a bandwidth less than or equal to a maximum configurable bandwidth of a BWP. The bandwidth of the NBWP is less than the carrier system bandwidth. The NBWP may hop over the carrier system bandwidth. The hopping may provide frequency diversity gains without increasing the BWP size or using a narrower active BWP.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
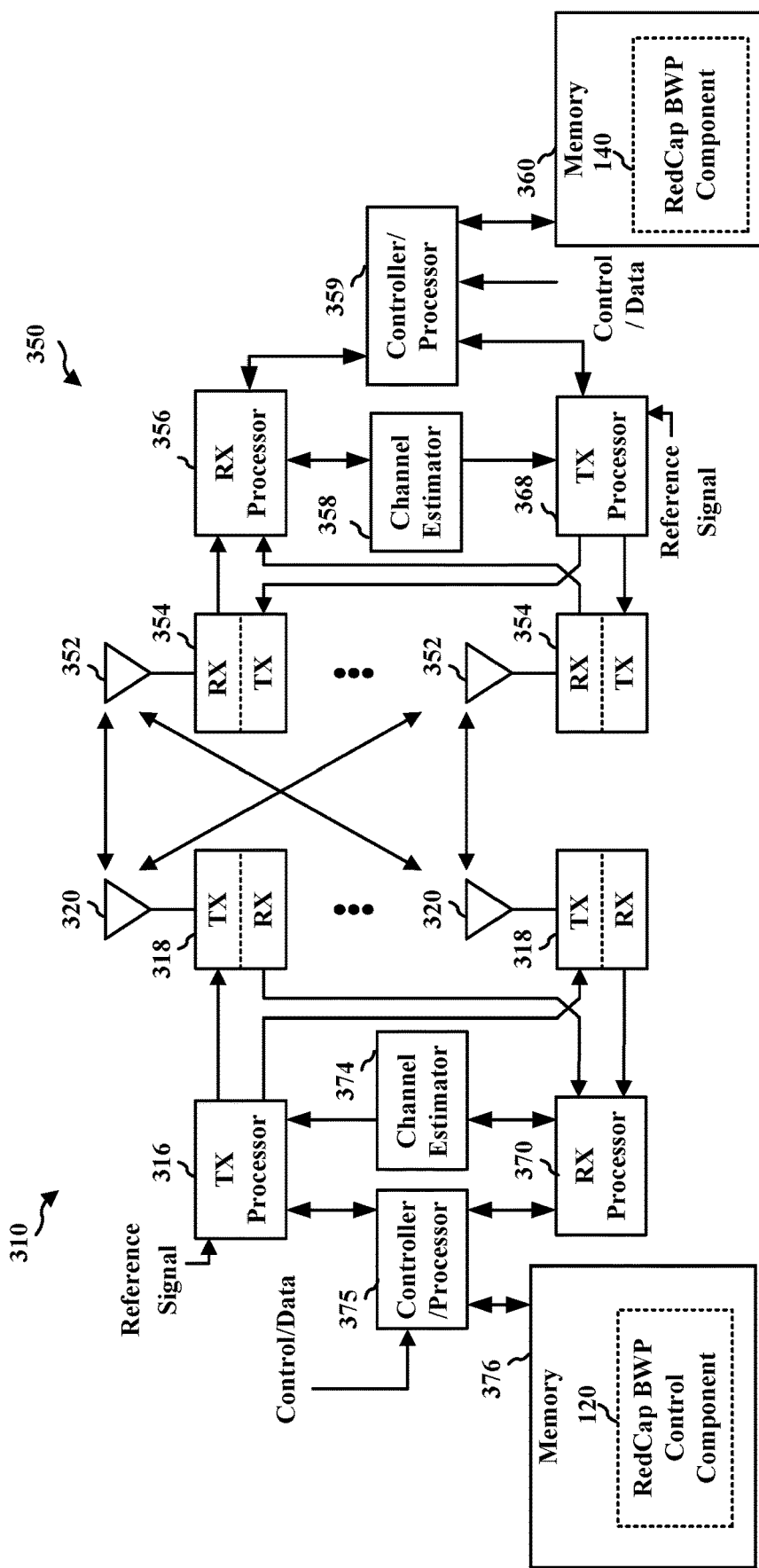
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the RedCap BWP component 140 of FIG. 1. For example, the memory 360 may include executable instructions defining the RedCap BWP component 140. The TX processor 368, the RX processor 356, and/or the controller/processor 359 may be configured to execute the RedCap BWP component 140.

At least one of the TX processor 316, the RX processor 370, and the controller/processor 375 may be configured to perform aspects in connection with the RedCap BWP control component 120 of FIG. 1. For example, the memory 376 may include executable instructions defining the RedCap BWP control component 120. The TX processor 316, the RX processor 370, and/or the controller/processor 375 may be configured to execute the RedCap BWP control component 120.

Figure 4:
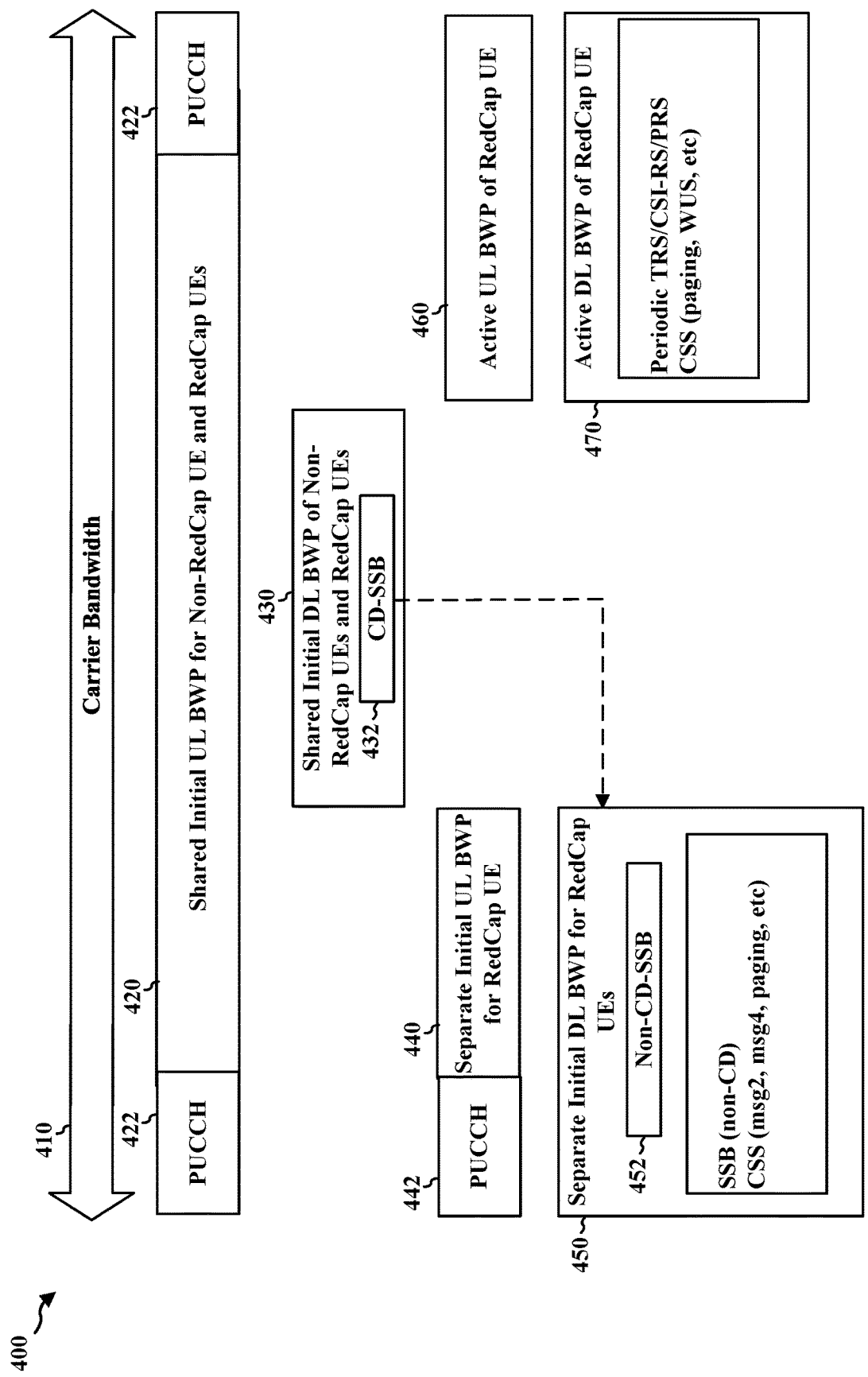
FIG. 4 is a diagram illustrating an example of a cell configuration including separate initial bandwidth parts (BWPs) and active BWPs for reduced capability (RedCap) UEs.

FIG. 4 is a diagram illustrating an example of a configuration 400 of multiple BWPs for a RedCap UE on a carrier bandwidth 410. The carrier bandwidth 410 may be, for example, a maximum system bandwidth. For instance, in 5G NR FR1, the maximum system bandwidth may be 100 MHz. A cell may be configured with a shared initial UL BWP 420 and a shared initial DL BWP 430. The shared initial UL BWP 420 and the shared initial DL BWP 430 may be used by both RedCap UEs and non-RedCap UEs. A non-RedCap UE or baseline device may refer to a first type of UE capable of using a BWP of a maximum BWP size, whereas a RedCap UE may refer a second type of UE that has lower maximum BWP size than the first type of UE for a frequency range. Descriptions here of a non-RedCap UE and a RedCap UE may be equally applicable the first type of UE and the second type of UE.

The differences between the first type of UE (e.g., non-RedCap UE) and the second type of UE (e.g., RedCap UE) may result in different usage of the shared initial UL BWP 420 and the shared initial DL BWP 430. In particular, the non-RedCap UEs may continue to use the shared initial UL BWP 420 and the shared initial DL BWP 430 as the initial BWPs after cell acquisition. For instance, a maximum BWP size for the non-RedCap UEs may be greater than or equal to the sizes of the shared initial UL BWP 420 and the shared initial DL BWP 430. In contrast, the maximum BWP size for the RedCap UEs may be less than the size of the shared initial UL BWP 420 and/or the size of the shared initial DL BWP 430. For instance, the RedCap UEs may be unable to communicate on a portion of the shared initial UL BWP 420 and/or the size of the shared initial DL BWP 430. For example, the shared initial UL BWP 420 may include PUCCH resource 422 configured at the edges of the carrier bandwidth 410 and the shared initial DL BWP 430 may carry CD-SSBs 432 near a center of the carrier bandwidth 410. The CD-SSBs 432 may be transmitted according to a channel raster such that the shared initial DL BWP 430 may be located during a cell search. As such, the CD-SSBs 432 define the cell. In an aspect, the RedCap UEs may receive a portion of the initial DL BWP 430 carrying the CD-SSBs 432 (e.g., an initial control resource set (CORESET)), but may not be able to transmit on the PUCCH resource 422 of the shared initial UL BWP 420.

In an aspect, the CD-SSBs 432 include or identify system information for a separate initial DL BWP 450 for RedCap UEs. The separate initial DL BWP 450 may carry non-CD-SSBs 452. The non-CD-SSBs 452 may carry some or all of the information for the cell and information for the separate initial DL BWP 450. The non-CD-SSBs 452 may include information for a separate UL BWP 440 for RedCap UEs. The separate UL BWP 440 may be located at an edge of the carrier bandwidth 410 and include PUCCH resource 442 that overlap the with PUCCH resource 422 of the shared initial UL BWP 420. A RedCap UE 104 may connect to the cell via the separate initial DL BWP 450 and the separate initial UL BWP 440. For instance, the RedCap UE 104 may receive the non-CD-SSBs 452 to obtain system information and perform measurements. The RedCap UE 104 may perform a random access procedure on the separate initial UL BWP 440. For instance, the separate initial UL BWP 440 may include physical random access channel (PRACH) occasions for transmitting an initial random access message. The separate initial DL BWP 450 may include a common search space for receiving subsequent random access message.

Once a RedCap UE 104 has accessed the cell, the network may configure the RedCap UE 104 with an active UL BWP 460 for RedCap UEs and an active DL BWP 470 for RedCap UEs. The active DL BWP 470 may be outside of the shared initial DL BWP 430 and/or the separate initial DL BWP 450. In an aspect, the active DL BWP 470 may be configured with signaling to facilitate operation of a RedCap UE. For example, the active DL BWP 470 may carry periodic reference signals such as a tracking reference signal (TRS), channel state information reference signal (CSI-RS), and/or positioning reference signal (PRS). The active DL BWP 470 may include a common search space (CSS) for paging and wake-up signal (WUS). The active DL BWP 470 may include dedicated RRC signaling for system information updates if a paging search space is not configured. The active DL BWP 470 may include layer 3 intra-frequency measurement gaps for measuring neighbor cells and/or reference signals on other BWPs (e.g., the shared initial DL BWP 430 and/or the separate initial DL BWP 450).

Figure 5:
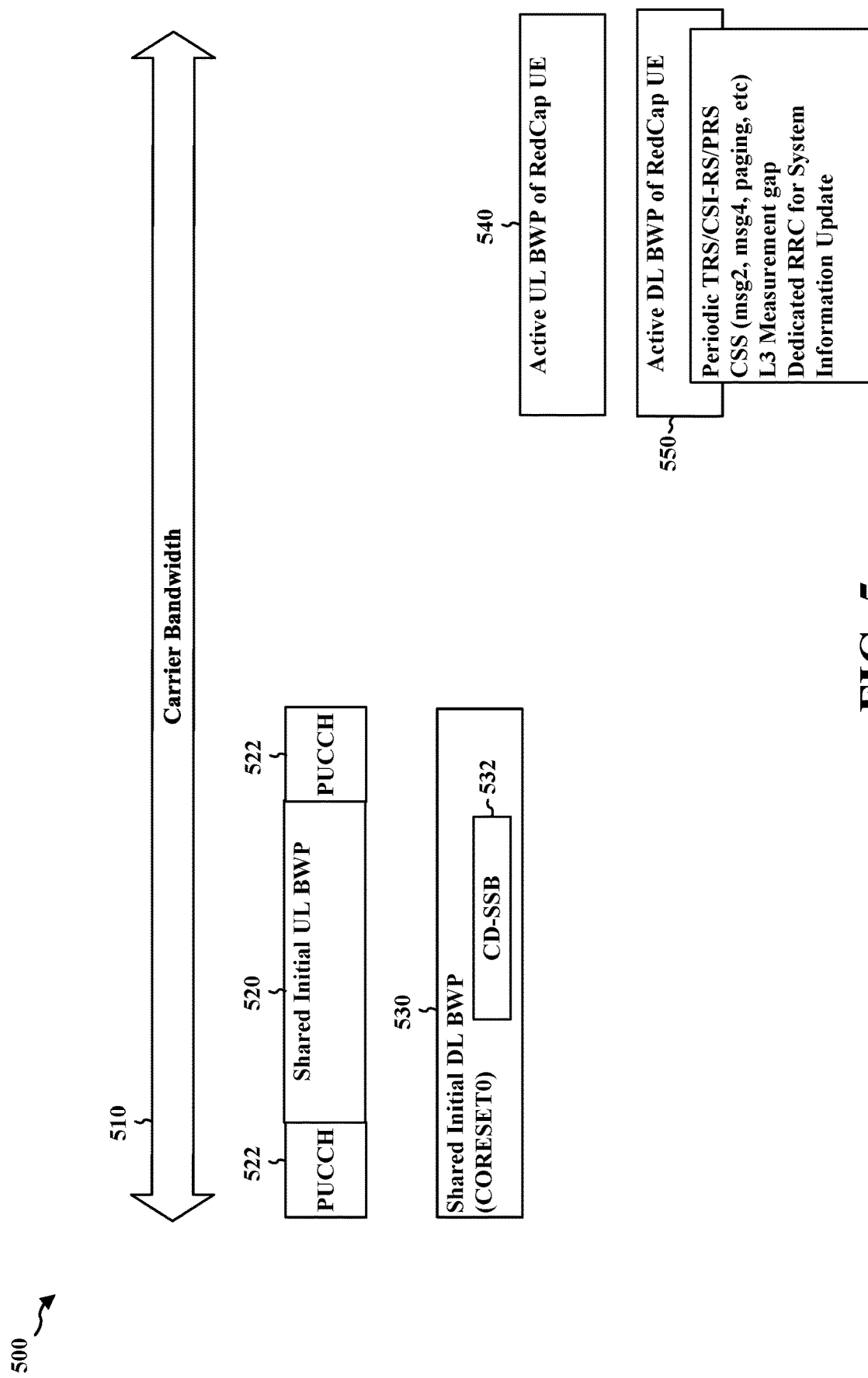
FIG. 5 is a diagram illustrating another example of a cell configuration including active BWPs for RedCap UEs.

FIG. 5 is a diagram illustrating another example of a configuration 500 of multiple BWPs for a RedCap UE on a carrier bandwidth 510. Similar to the configuration 400, the configuration 500 may include a shared initial UL BWP 520 and a shared initial DL BWP 530 that may be used by both a first type of UE (e.g., non-RedCap UEs) and a second type of UE (e.g., RedCap UEs). The shared initial UL BWP 520 may include PUCCH resources 522 located at the edges of the shared initial UL BWP 520. The shared initial DL BWP 530 may include a CORESETO carrying CD-SSBs 532.

The RedCap UE 104 may access the cell via the shared initial DL BWP 530. The network may configure the RedCap UE 104 with an active UL BWP 540 for RedCap UEs and an active DL BWP 550 for RedCap UEs. The active DL BWP 470 may be outside of the shared initial DL BWP 530. In an aspect, the active DL BWP 470 may be configured with signaling to facilitate operation of a RedCap UE. For example, the active DL BWP 470 may carry periodic reference signals such as a TRS, CSI-RS, and/or PRS. The active DL BWP 470 may include a CSS for paging and wake-up signal (WUS). The active DL BWP 470 may include dedicated RRC signaling for system information updates. The active DL BWP 470 may include layer 3 intra-frequency measurement gaps for measuring neighbor cells and/or reference signals on other BWPs (e.g., the shared initial DL BWP 530).

In an aspect, under the configuration 400 or the configuration 500, a RedCap UE configured with an active DL BWP 460, 540 may obtain various information from the active DL BWP 460, 540, the shared DL BWP 430, 530, and/or the separate initial DL BWP 450. For simplicity, further descriptions make reference to the configuration 400, but may also be applicable to the configuration 500. Examples of information that a RedCap UE may obtain include paging messages, updated system information, measurements such as layer 3 measurements and neighbor cell measurements, and neighbor cell system information during RRC re-establishment or release with redirection.

In connected mode, a UE 104 may receive updated system information. When the cell updates system information, the cell may transmit a paging message to inform connected UEs to obtain the updated system information. For non-RedCap UEs, the UE may receive paging information on the CSS of the initial DL BWP, obtain a management information block (MIB) from the CD-SSBs 432, and locate remaining minimum system information (RMSI) from the MIB. In the configurations 400 and 500, the active BWP of the RedCap UE may not overlap with the CSS of the initial DL BWP or the CD-SSB.

Figure 6:
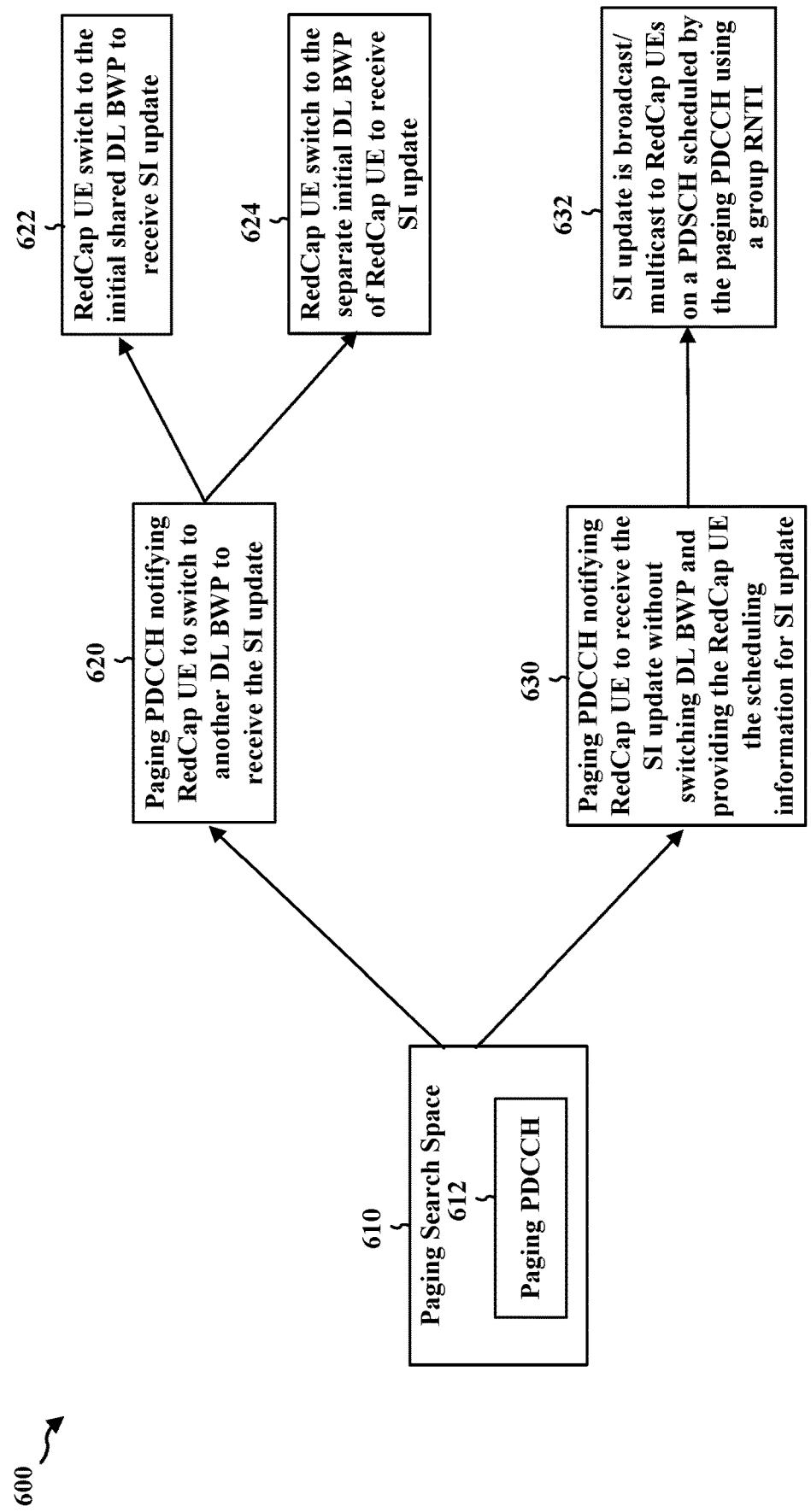
FIG. 6 is a diagram illustrating examples of techniques for obtaining updated system information in a configuration with multiple BWPs.

FIG. 6 is a diagram 600 illustrating techniques for obtaining updated system information for a RedCap UE 104 configured with an active DL BWP 470, 550 for RedCap UEs. The active DL BWP 470, 550 may be configured with a paging search space 610. The paging search space 610 may be part of a CSS. The paging search space 610 may be jointly or separately configured with a WUS search space. The UE 104 may monitor the paging search space 610 for a paging PDCCH 612. When the RedCap UE 104 operates in half-duplex frequency domain duplexing (HD-FDD) on the active downlink BWP, receiving the paging search space may be prioritized over uplink transmissions when paging occasions overlap with semi-static or dynamically configured uplink transmissions. If the paging PDCCH 612 indicates that system info has been updated, the UE may switch to either the shared initial DL BWP 430, 530 or the separate initial DL BWP 450 to receive a system information update, or stay in the active DL BWP 470, 550 and decode a broadcast/multicast PDSCH.

For example, at block 620, the paging PDCCH 612 may indicate to switch BWPs to receive the system information update. At block 622, the paging PDCCH notifies the RedCap UE to switch to another DL BWP to receive the system information update. The UE may receive an indication of whether the initial downlink BWP for obtaining the updated system information is the shared initial BWP or the separate initial downlink BWP. For example, the indication may be one of: presence of system information in the separate initial downlink BWP, a radio network temporary identifier (RNTI) scrambling of a cyclic redundancy check (CRC) of the paging PDCCH 612, a BWP identifier in the paging PDCCH 612, a DMRS configuration of the paging PDCCH 612, or a paging occasion configuration of the paging PDCCH 612. Based on the indication, the UE 104 may switch to the initial shared DL BWP 430, 530 at block 622, or switch to the separate initial DL BWP 450 at block 624.

As another example, at block 630, the paging PDCCH 612 may indicate that the RedCap UE is to receive a system information update without switching DL BWP. The paging PDCCH 612 may schedule the system information update on the active DL BWP 470, 550. For instance, the paging PDCCH may indicate the PDSCH on the active downlink BWP 470, 550 for RedCap UEs via one of a RNT) scrambling of a CRC of the paging PDCCH, a BWP identifier in the paging PDCCH, a DMRS configuration of the paging PDCCH, or a paging occasion configuration of the paging PDCCH. At block 632, the system information update is broadcast or multicast to RedCap UEs on a PDSCH scheduled by the paging PDCCH using a group RNTI, which may be a function of a cell ID, BWP ID, or a group-common parameter.

Figure 7:
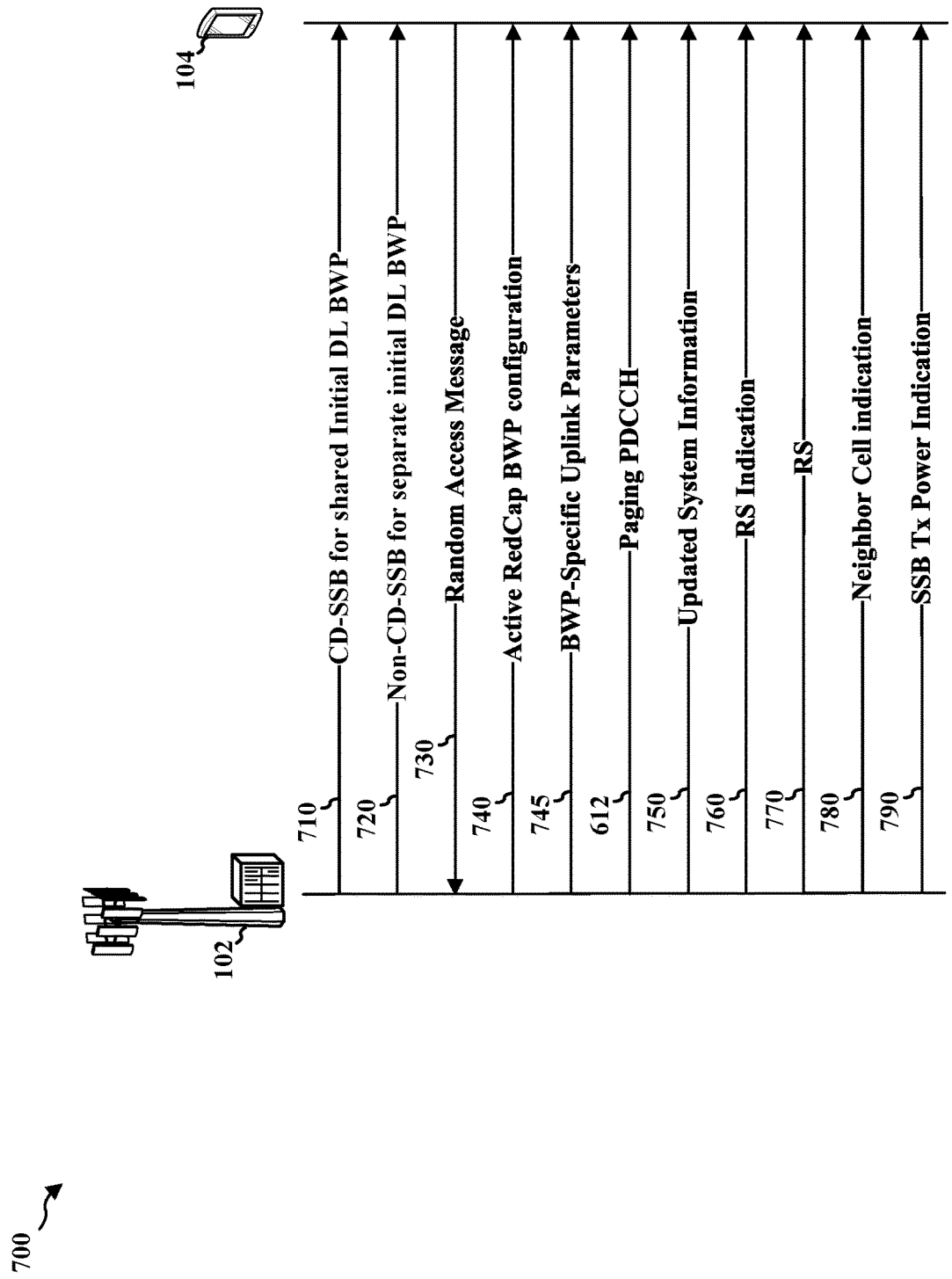
FIG. 7 is a message diagram illustrating example messages for managing multiple BWPs.

FIG. 7 is a message diagram 700 illustrating example messages between a base station 102 and a UE 104 for obtaining information with multiple BWP for a RedCap UE. The base station 102 may broadcast a CD-SSB 710 for the shared initial DL BWP 430, 530. In some implementations, the base station 102 may also broadcast a non-CD-SSB 720 for the separate DL BWP 450.

The UE 104 may transmit a random access message 730. For example, the random access message 730 may be a first random access message such as Msg1 in a 4-step random access procedure or MsgA in a 2-step random access procedure. When the cell is configured with both the shared initial DL BWP 430 and the separate initial DL BWP 450, the UE 104 may select between the CD-SSB 710 and the non-CD-SSB 720 for transmitting the first random access message. In some implementations, system information indicated by the CD-SSB 710 and/or the non-CD-SSB 720 may explicitly indicate which SSB to use. In some implementations, rules may identify a preference or ranking of the SSBs. For instance, the UE 104 may initially transmit the first random access message based on the CD-SSB 710, and transmit a retransmission of the first random access message based on the non-CD-SSB 720 if a time between the initial transmission and the retransmission is greater than a threshold (thereby allowing the UE to measure the non-CD-SSB 720).

After the random access procedure, the base station 102 may transmit an active RedCap BWP configuration 740 for the active DL BWP 470, 550 and the active UL BWP 460, 540. For example, the active RedCap BWP configuration 740 may be an RRC configuration. In some implementations, the active RedCap BWP configuration 740 may include a configuration of the paging search space 610. The RedCap UE 104 may switch to the active DL BWP 470, 550 and the active UL BWP 460, 540 for communications in connected mode.

In some implementations, the base station 102 may transmit BWP-specific uplink parameters 745. For example, the transmit BWP-specific uplink parameters 745 may include BWP-specific power control parameters, a frequency hopping flag, coverage enhancement parameters, and/or waveform configurations for UL channels (e.g., PRACH/PUSCH/PUCCH/SRS) for one or more of the UL BWPs (e.g., shared UL BWP 420, separate UL BWP 440, or active UL BWP 460). The BWP-specific uplink parameters 745 may be communicated as a BWP configuration or reconfiguration information (e.g., in active RedCap BWP configuration 740). The BWP-specific uplink parameters 745 may be communicated as a BWP switching command (e.g., on a DCI or MAC-CE). The BWP-specific uplink parameters 745 may be communicated as a system information updated dedicated to RedCap UEs (e.g., on the separate DL BWP 450 or the active DL BWP 470, 550).

The base station 102 may transmit the paging PDCCH 612. Where the paging search space 610 is configured on the active DL BWP 470, 550, the UE 104 may receive the paging PDCCH 612 without switching BWP. As discussed above regarding FIG. 6, the RedCap UE 104 may switch to the shared DL BWP 430, 530 or the separate initial DL BWP 550 to receive updated system information 750. Alternatively, if indicated by the paging PDCCH 612, the RedCap UE 104 may remain on the active DL BWP 470, 550 to receive a PDSCH carrying updated system information.

When the active DL BWP 470, 550 is not configured with the paging search space 610, the RedCap UE 104 may periodically switch to the separate initial DL BWP 550 to receive the paging PDCCH 612 and/or the updated system information 750. In a first option, the RedCap UE 104 may receive the paging PDCCH 612 on the separate initial DL BWP 550. If the paging PDCCH 612 indicates updated system information, the RedCap UE 104 may switch to the shared DL BWP 430 to receive the updated system information 750. In a second option, the updated system information 750 may be broadcast on the separate initial DL BWP 550, and the RedCap UE 104 may periodically receive the updated system information 750 to determine whether an update has occurred (e.g., without receiving the paging PDCCH 612). In a third option, the RedCap UE 104 may receive the paging PDCCH 612 on the separate initial DL BWP 550 and receive the updated system information 750 on the separate initial DL BWP 550 based on the paging PDCCH 612.

The base station 102 may transmit a reference signal (RS) indication 760. The RS indication 760 may identify a measurement resource on one of the active downlink BWP, the separate initial downlink BWP, or the shared initial downlink BWP. For example, the measurement resource may be for layer 3 measurements such as a reference signal received power (RSRP), a reference signal received quality (RSRQ), a signal to interference plus noise ratio (SINR), a signal to noise ratio (SNR), or a combination thereof. The measurement resource may be one or more of a SSB, a CSI-RS, or a PRS. The base station 102 may transmit the indicated reference signal 770 on the indicated measurement resource.

The RS indication 760 may be communicated through one or more combinations of system information, RRC signaling, MAC-CE, and DCI. In the case where the measurement resource is on the separate initial downlink BWP, or the shared initial downlink BWP, the RS indication 760 may configure measurement gaps on the active DL BWP 470, 550 for the RedCap UE 104 to switch BWPs to perform the measurements. In some implementations, the measurements include neighbor cell measurements based on system information of neighbor cells. The system information of the neighbor cells may be provided in the active RedCap BWP configuration 740. Accordingly, the RedCap UE may be able to obtain system information of neighbor cells even if full system information is not transmitted in the separate initial DL BWP 450 of the neighbor cells.

In some implementations, the base station 102 may transmit a neighbor cell indication 780. The neighbor cell indication 780 may indicate whether neighbor cells are configured with a separate DL BWP 450 for RedCap UEs that carries system information. The neighbor cell indication 780 may indicate whether the separate DL BWP 450 is to be used for RRC re-establishment or RRC release with redirection. For example, a default configuration may be to use the shared initial downlink BWP 430 as a fallback BWP during RRC re-establishment or RRC release with redirection. If the RedCap UE 104 receives the neighbor cell indication 780, the RedCap UE 104 may use the separate DL BWP 450 of the neighbor cells as the fallback BWP.

In some implementations, the active RedCap BWP configuration 740 includes different measurement gaps to measure the CD-SSB 710 of the shared initial downlink BWP and a non-CD-SSB 720 of the separate initial downlink BWP. The base station 102 may transmit an SSB Tx power indication 790 for the CD-SSB 710 and the non-CD-SSB 720. The SSB Tx power indication 790 may include an indication of an absolute transmit power of the CD-SSB 710 of the shared initial downlink BWP 430. 530 and a differential transmit power of the non-CD-SSB 720 of the separate initial downlink BWP 450.

FIG. 8 is a conceptual data flow diagram 800 illustrating the data flow between different means/components in an example base station 802, which may be an example of the base station 102 including the RedCap BWP control component 120. The RedCap BWP control component 120 may be implemented by the memory 376 and the TX processor 316, the RX processor 370, and/or the controller/processor 375 of FIG. 3. For example, the memory 376 may store executable instructions defining the RedCap BWP control component 120 and the TX processor 316, the RX processor 370, and/or the controller/processor 375 may execute the instructions.

The base station 102 may include a receiver component 870, which may include, for example, a radio frequency (RF) receiver for receiving the signals described herein. The base station 102 may include a transmitter component 872, which may include, for example, an RF transmitter for transmitting the signals described herein. In an aspect, the receiver component 870 and the transmitter component 872 may be co-located in a transceiver such as illustrated by the TX/RX 318 in FIG. 3.

As discussed with respect to FIG. 1, the RedCap BWP control component 120 may include the shared initial BWP component 810, the separate initial BWP component 820, the active BWP component 830, the paging component 840, and the system information update component 850. The RedCap BWP control component 120 may optionally include an uplink configuration component 860.

The receiver component 870 may receive UL signals from the UE 104 including UL communications. In some implementations, the receiver component 870 may optionally receive a random access message from the UE 104 seeking to connect to the base station 802. The receiver component 870 may provide an identification of the UE 104 to the active BWP component 830.

The shared initial BWP component 810 may transmit, via transmitter component 872, CD-SSB 710 that defines the shared initial downlink BWP 430, 530 for RedCap UEs and non-RedCap UEs. For example, the CD-SSB 710 may include or identify system information. The shared initial BWP component 810 may update the system information and provide an indication of the update to the paging component 840.

The separate initial BWP component 820 may transmit, via transmitter component 872, the non-CD-SSB 720 for a separate initial downlink BWP for RedCap UEs. For example, the non-CD-SSB 710 may include or identify system information specific for RedCap UEs. In some implementations, the system information transmitted by the separate initial BWP component 820 on the separate initial downlink BWP 550 may include some or all of the system information transmitted by the shared initial BWP component 810. The separate initial BWP component 820 may update the system information and provide an indication of the update to the paging component 840.

The active BWP component 830 may receive a random access message and/or identification of a RedCap UE 104 from the receiver component 870. The active BWP component 830 may configure an active DL BWP 470, 550 and the active UL BWP 460, 540 for the RedCap UE 104. For example, the active BWP component 830 may transmit, via transmitter component 872, an RRC configuration message including a configuration of the active DL BWP 470, 550 and the active UL BWP 460, 540.

The paging component 840 may receive an indication from the shared initial BWP component 810 and/or the separate initial BWP component 820 indicating that system information has been updated. The paging component 840 may transmit, via the transmitter component 872, a paging PDCCH 612 indicating the update to the system information. When the updated system information is to be transmitted as a PDSCH on the active DL BWP 470, 550, the paging component 840 may schedule the PDSCH and include scheduling information in the paging PDCCH 612. The paging component 840 may provide the resources for the PDSCH to the system information update component 850.

The system information update component 850 may transmit updated system information on the shared initial downlink BWP, the separate initial downlink BWP, or the active downlink BWP as indicated by the paging PDCCH 612. For example, the system information update component 850 may receive the resources for the PDSCH from the paging component 840 and transmit the updated system information 750 as a PDSCH on the active DL BWP 470, 550.

The uplink configuration component 860 may transmit the BWP-specific uplink parameters 745 for the initial uplink BWP 440 for RedCap UEs or an active uplink BWP 460, 540 for RedCap UEs.

Figure 9:
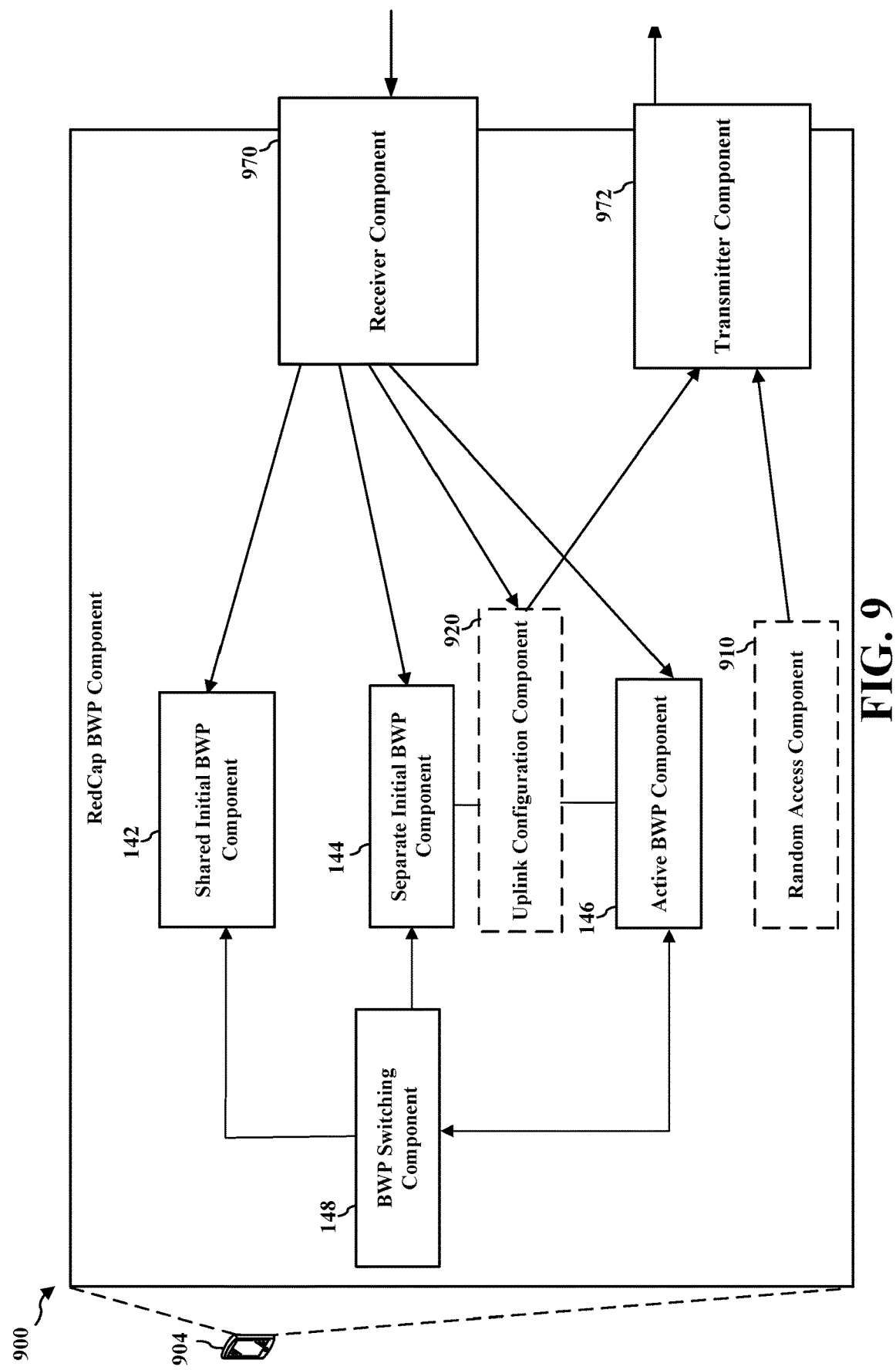
FIG. 9 is a conceptual data flow diagram illustrating the data flow between different means/components in an example UE.

FIG. 9 is a conceptual data flow diagram 900 illustrating the data flow between different means/components in an example UE 904, which may be an example of the UE 104 and include the RedCap BWP component 140. The RedCap BWP component 140 may be implemented by the memory 360 and the TX processor 368, the RX processor 356, and/or the controller/processor 359. For example, the memory 360 may store executable instructions defining the RedCap BWP component 140 and the TX processor 368, the RX processor 356, and/or the controller/processor 359 may execute the instructions.

The UE 104 may include a receiver component 970, which may include, for example, a RF receiver for receiving the signals described herein. The UE 104 may include a transmitter component 972, which may include, for example, an RF transmitter for transmitting the signals described herein. In an aspect, the receiver component 970 and the transmitter component 972 may co-located in a transceiver such as the TX/RX 352 in FIG. 3.

As discussed with respect to FIG. 1, the RedCap BWP component 140 may include the shared initial BWP component 142, the separate initial BWP component 144, the active BWP component 146, and the BWP switching component 148. In some implementations, the RedCap BWP component 140 may optionally include a random access component 910 and/or an uplink configuration component 920.

The receiver component 970 may receive DL signals described herein such as the CD-SSB 710, non-CD-SSB 720, active RedCap BWP configuration 740, BWP-specific uplink parameters 745, paging PDCCH 612, updated system information 750, RS indication 760, RS 770, neighbor cell indication 780, and SSB Tx Power Indication 790. The receiver component 970 may provide the CD-SSB 710 to the shared initial BWP component 142. The receiver component 970 may provide the non-CD-SSB 720 to the separate initial BWP component 144. The receiver component 970 provide the active RedCap BWP configuration 740, updated system information 750, RS indication 760, RS 770, neighbor cell indication 780, and SSB Tx power Indication 790 to the active BWP component 146. The receiver component 970 may provide the BWP-specific uplink parameters 745 to the uplink configuration component 920. The receiver component 970 may provide the paging PDCCH 612 to the BWP switching component 148.

The shared initial BWP component 142 may receive the CD-SSB 710 via the receiver component 970. The shared initial BWP component 142 may obtain system information based on the CD-SSB 710. The system information may include a location of the non-CD-SSB 720. The shared initial BWP component 142 may control the receiver component 970 to receive the non-CD-SSB 720.

The separate initial BWP component 144 may receive the non-CD-SSB 720 via the receiver component 970. The separate initial BWP component 144 may receive system information for RedCap UEs based on the non-CD-SSB 720. For example, the separate initial BWP component 144 may determine RACH occasions on the separate initial uplink BWP 440. The separate initial BWP component 144 may provide the RACH occasions to the random access component 910.

The random access component 910 may receive the RACH occasions from the separate initial BWP component 144. In some implementations, the random access component 910 may receive the CD-SSB 710 and the non-CD-SSB 720 or measurements thereof. The random access component 910 may accessing a cell via the separate initial downlink BWP 450 (e.g., based on the identified RACH occasions). For instance, the random access component 910 may transmit a random access message on the RACH occasions. The random access component 910 may selecting one of the CD-SSB 710 or the non-CD-SSB 720 for transmitting the random access message based on system information received on the shared initial BWP or the separate initial BWP.

The active BWP component 146 may receive an active RedCap BWP configuration 740 via the receiver component 970. The active RedCap BWP configuration 740 may be in response to the random access procedure (e.g., the UE connecting to the cell). The active BWP component 146 may forward signaling received on the active downlink BWP 470 to the BWP switching component 148.

The BWP switching component 148 may switch the UE 904 between BWPs including the shared initial downlink BWP 430, the separate initial downlink BWP 450, and the active downlink BWP 470. For example, the BWP switching component 148 may select a BWP for receiving various information. For instance, the BWP switching component 148 may control the UE 904 to receive the paging PDCCH on the separate initial downlink BWP 450 or the active downlink BWP 470 depending on a configuration of the paging search space 610. When a paging PDCCH 612 is received, the BWP switching component 148 may control the UE 904 to receive the updated system information 750 on the BWP indicated by the paging PDCCH.

Figure 10:
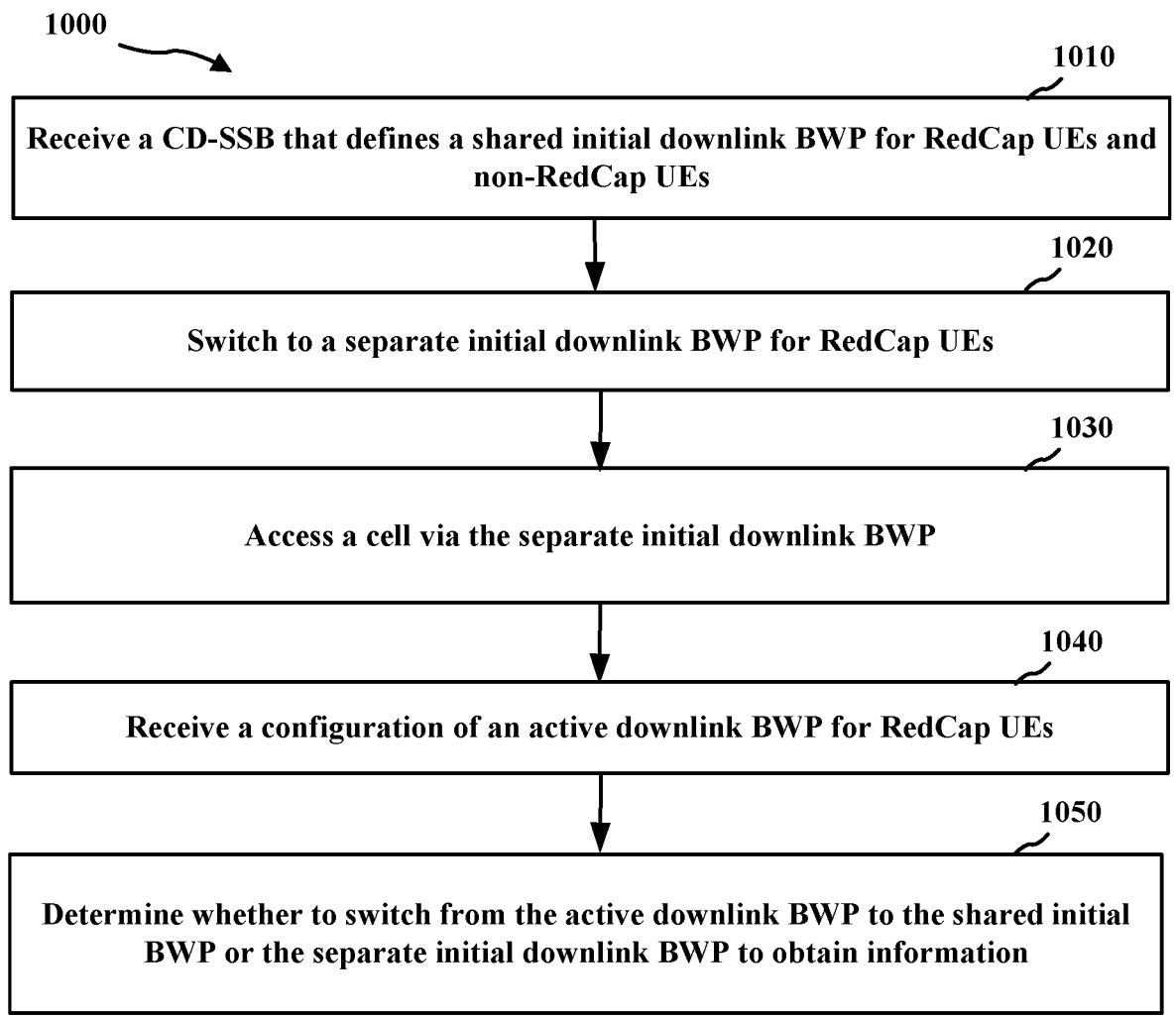
FIG. 10 is a flowchart of an example of a method for a UE to obtain information in a configuration with multiple BWPs.

FIG. 10 is a flowchart of an example method 1000 for a RedCap UE configured with multiple BWPs to obtain information. The method 1000 may be performed by a UE (such as the UE 104, which may include the memory 360 and which may be the entire UE 104 or a component of the UE 104 such as the RedCap BWP component 140, TX processor 368, the RX processor 356, or the controller/processor 359). The method 1000 may be performed by the RedCap BWP component 140 in communication with the RedCap BWP control component 120 of the base station 102. Optional blocks are shown with dashed lines.

At block 1010, the method 1000 may include receiving a CD-SSB that defines a shared initial downlink BWP for RedCap UEs and non-RedCap UEs. In some implementations, for example, the UE 104, the RX processor 356 or the controller/processor 359 may execute the RedCap BWP component 140 or the shared initial BWP component 142 to receive the CD-SSB 720 that defines a shared initial downlink BWP 430 for RedCap UEs and non-RedCap UEs. Accordingly, the UE 104, the RX processor 356, or the controller/processor 359 executing the RedCap BWP component 140 or the shared initial BWP component 142 may provide means for receiving a CD-SSB that defines a shared initial downlink BWP for RedCap UEs and non-RedCap UEs.

At block 1020, the method 1000 may include switching to a separate initial downlink BWP for RedCap UEs. In some implementations, for example, the UE 104, the RX processor 356 or the controller/processor 359 may execute the RedCap BWP component 140 or the separate initial BWP component 144 to switch to a separate initial downlink BWP 450 for RedCap UEs. Accordingly, the UE 104, the RX processor 356, or the controller/processor 359 executing the RedCap BWP component 140 or the separate initial BWP component 144 may provide means for switching to a separate initial downlink BWP for RedCap UEs.

At block 1030, the method 1000 may include accessing a cell via the separate initial downlink BWP. In some implementations, for example, the UE 104, the TX processor 368, or the controller/processor 359 may execute the RedCap BWP component 140 or the random access component 910 to access a cell via the separate initial downlink BWP 450. Accordingly, the UE 104, the TX processor 368, or the controller/processor 359 executing the RedCap BWP component 140 or the random access component 910 may provide means for accessing a cell via the separate initial downlink BWP.

At block 1040, the method 1000 may include receiving a configuration of an active downlink BWP for RedCap UEs. In some implementations, for example, the UE 104, the RX processor 356, or the controller/processor 359 may execute the RedCap BWP component 140 or the active BWP component 146 to receive a configuration 740 of an active downlink BWP 470 for RedCap UEs. Accordingly, the UE 104, the RX processor 356, or the controller/processor 359 executing the RedCap BWP component 140 or the active BWP component 146 may provide means for receiving a configuration of an active downlink BWP for RedCap UEs.

At block 1050, the method 1000 may include determining whether to switch from the active downlink BWP to the shared initial BWP or the separate initial downlink BWP to obtain information. In some implementations, for example, the UE 104, the RX processor 356, or the controller/processor 359 may execute the RedCap BWP component 140 or the BWP switching component 148 to determine whether to switch from the active downlink BWP to the shared initial BWP or the separate initial downlink BWP to obtain information. Accordingly, the UE 104, the RX processor 356, the TX processor 368, or the controller/processor 359 executing the RedCap BWP component 140 or the BWP switching component 148 may provide means for determining whether to switch from the active downlink BWP to the shared initial BWP or the separate initial downlink BWP to obtain information.

Figure 11:
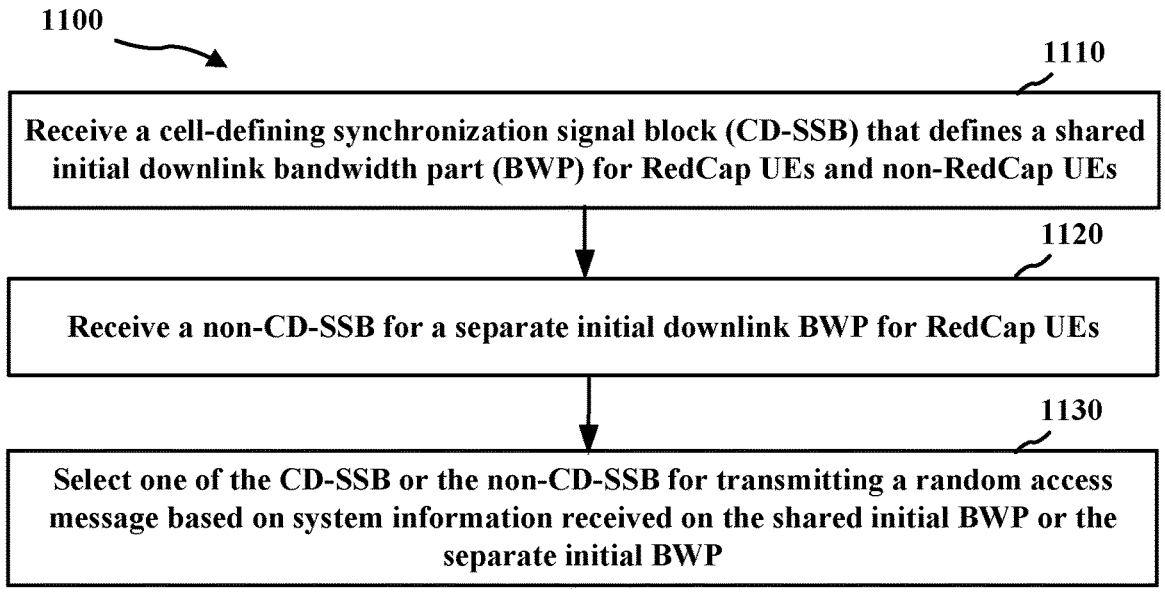
FIG. 11 is a flowchart of an example of a method for a UE to initiate a random access procedure in a configuration with multiple BWPs.

FIG. 11 is a flowchart of an example method 1100 for a RedCap UE configured with multiple BWPs to initiate random access. The method 1100 may be performed by a UE (such as the UE 104, which may include the memory 360 and which may be the entire UE 104 or a component of the UE 104 such as the RedCap BWP component 140, TX processor 368, the RX processor 356, or the controller/processor 359). The method 1100 may be performed by the RedCap BWP component 140 in communication with the RedCap BWP control component 120 of the base station 102. Optional blocks are shown with dashed lines.

At block 1110, the method 1100 may include receiving a CD-SSB that defines a shared initial downlink BWP for RedCap UEs and non-RedCap UEs. In some implementations, for example, the UE 104, the RX processor 356 or the controller/processor 359 may execute the RedCap BWP component 140 or the shared initial BWP component 142 to receive the CD-SSB 720 that defines a shared initial downlink BWP 430 for RedCap UEs and non-RedCap UEs. Accordingly, the UE 104, the RX processor 356, or the controller/processor 359 executing the RedCap BWP component 140 or the shared initial BWP component 142 may provide means for receiving a CD-SSB that defines a shared initial downlink BWP for RedCap UEs and non-RedCap UEs.

At block 1120, the method 1100 may include receiving a non-CD-SSB for a separate initial downlink BWP for RedCap UEs. In some implementations, for example, the UE 104, the RX processor 356 or the controller/processor 359 may execute the RedCap BWP component 140 or the separate initial BWP component 144 to receive the non-CD-SSB 720 for a separate initial downlink BWP 450 for RedCap UEs. Accordingly, the UE 104, the RX processor 356, or the controller/processor 359 executing the RedCap BWP component 140 or the separate initial BWP component 144 may provide means for receiving a non-CD-SSB for a separate initial downlink BWP for RedCap UEs.

At block 1130, the method 1100 may include selecting one of the CD-SSB or the non-CD-SSB for transmitting a random access message based on system information received on the shared initial BWP or the separate initial BWP. In some implementations, for example, the UE 104, the TX processor 368, or the controller/processor 359 may execute the RedCap BWP component 140 or the random access component 910 to select one of the CD-SSB or the non-CD-SSB for transmitting a random access message based on system information received on the shared initial BWP or the separate initial BWP. Accordingly, the UE 104, the TX processor 368, or the controller/processor 359 executing the RedCap BWP component 140 or the random access component 910 may provide means for selecting one of the CD-SSB or the non-CD-SSB for transmitting a random access message based on system information received on the shared initial BWP or the separate initial BWP.

Figure 12:
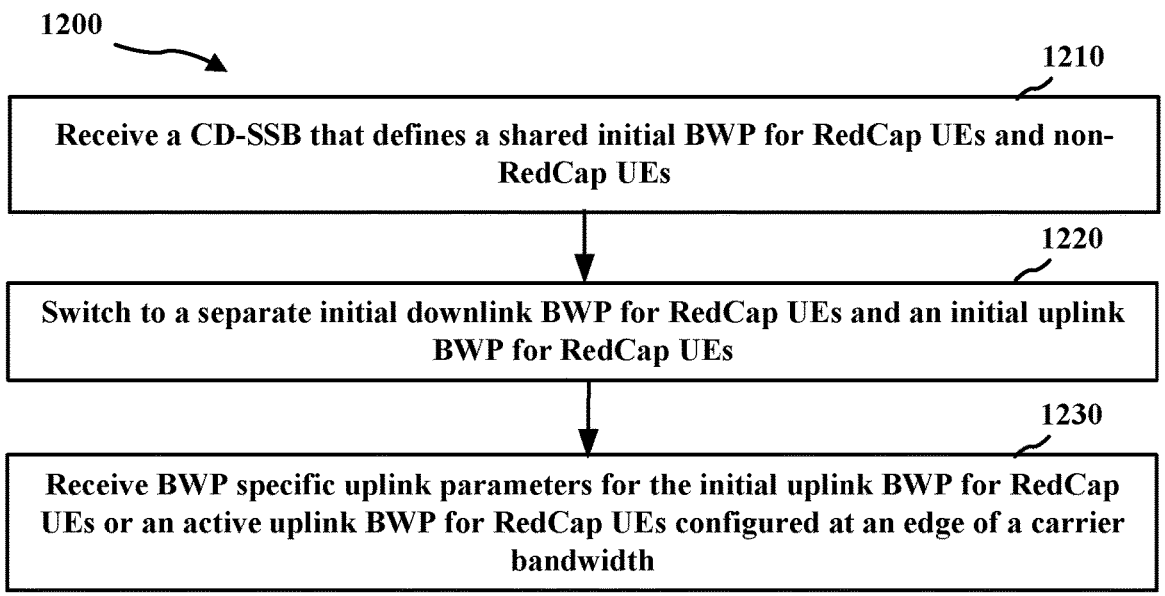
FIG. 12 is a flowchart of an example of a method for a UE to configure BWP-specific uplink parameters in a configuration with multiple BWPs.

FIG. 12 is a flowchart of an example method 1200 for a RedCap UE configured with multiple BWPs to configure BWP-specific uplink parameters. The method 1200 may be performed by a UE (such as the UE 104, which may include the memory 360 and which may be the entire UE 104 or a component of the UE 104 such as the RedCap BWP component 140, TX processor 368, the RX processor 356, or the controller/processor 359). The method 1000 may be performed by the RedCap BWP component 140 in communication with the RedCap BWP control component 120 of the base station 102. Optional blocks are shown with dashed lines.

At block 1210, the method 1200 may include receiving a CD-SSB that defines a shared initial downlink BWP for RedCap UEs and non-RedCap UEs. In some implementations, for example, the UE 104, the RX processor 356 or the controller/processor 359 may execute the RedCap BWP component 140 or the shared initial BWP component 142 to receive the CD-SSB 720 that defines a shared initial downlink BWP 430 for RedCap UEs and non-RedCap UEs. Accordingly, the UE 104, the RX processor 356, or the controller/processor 359 executing the RedCap BWP component 140 or the shared initial BWP component 142 142 may provide means for receiving a CD-SSB that defines a shared initial downlink BWP for RedCap UEs and non-RedCap UEs.

At block 1220, the method 1200 may include switching to a separate initial downlink BWP for RedCap UEs and an initial uplink BWP for RedCap UEs. In some implementations, for example, the UE 104, the RX processor 356 or the controller/processor 359 may execute the RedCap BWP component 140 or the separate initial BWP component 144 to switch to the separate initial downlink BWP 450 for RedCap UEs and the initial uplink BWP 440 for RedCap UEs. Accordingly, the UE 104, the RX processor 356, or the controller/processor 359 executing the RedCap BWP component 140 or the separate initial BWP component 144 may provide means for switching to a separate initial downlink BWP for RedCap UEs and an initial uplink BWP for RedCap UEs.

At block 1230, the method 1200 may include receiving BWP specific uplink parameters for the initial uplink BWP for RedCap UEs or an active uplink BWP for RedCap UEs configured at an edge of a carrier bandwidth. In some implementations, for example, the UE 104, the RX processor 356, or the controller/processor 359 may execute the RedCap BWP component 140 or the uplink configuration component 920 to receive BWP-specific uplink parameters 745 for the initial uplink BWP 440 for RedCap UEs or the active uplink BWP 460 for RedCap UEs configured at an edge of a carrier bandwidth 410. Accordingly, the UE 104, the RX processor 356, the TX processor 368, or the controller/processor 359 executing the RedCap BWP component 140 or the uplink configuration component 920 may provide means receiving BWP specific uplink parameters for the initial uplink BWP for RedCap UEs or an active uplink BWP for RedCap UEs configured at an edge of a carrier bandwidth.

Figure 13:
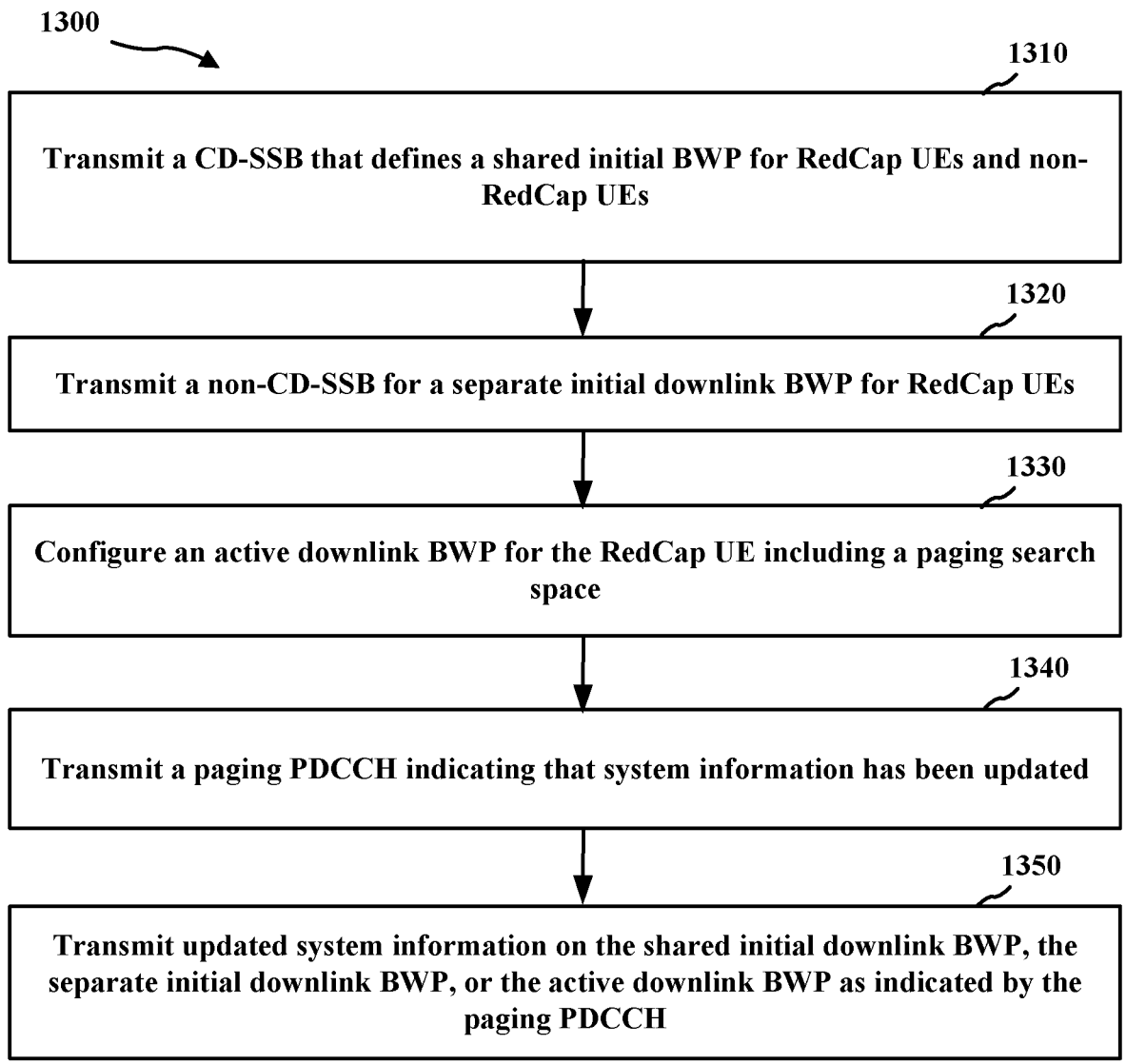
FIG. 13 is a flowchart of an example method for a BS to support a RedCap UE with multiple BWPs.

FIG. 13 is a flowchart of an example method 1300 for a base station to control multiple BWPs for a RedCap UE. The method 1300 may be performed by a base station (such as the base station 102, which may include the memory 376 and which may be the entire base station 102 or a component of the base station 102 such as the RedCap BWP control component 120, the TX processor 316, the RX processor 370, or the controller/processor 375). The method 1300 may be performed by the RedCap BWP control component 120 in communication with the RedCap BWP component 140 of the UE 104.

At block 1310, the method 1300 may include transmitting a CD-SSB that defines a shared initial BWP for RedCap UEs and non-RedCap UEs. In some implementations, for example, the base station 102, the TX processor 316, or the controller/processor 375 may execute the RedCap BWP control component 120 or the shared initial BWP component 810 to transmit a CD-SSB that defines a shared initial BWP for RedCap UEs and non-RedCap UEs. Accordingly, the base station 102, the TX processor 316, or the controller/processor 375 executing the RedCap BWP control component 120 or the shared initial BWP component 810 may provide means for transmitting a CD-SSB that defines a shared initial BWP for RedCap UEs and non-RedCap UEs.

At block 1320, the method 1300 may include transmitting a non-CD-SSB for a separate initial downlink BWP for RedCap UEs. In some implementations, for example, base station 102, the TX processor 316, or the controller/processor 375 may execute the RedCap BWP control component 120 or the separate initial BWP component 820 to transmit a non-CD-SSB 720 for a separate initial downlink BWP 450 for RedCap UEs. Accordingly, the base station 102, the TX processor 316, or the controller/processor 375 executing the RedCap BWP control component 120 or the separate initial BWP component 820 may provide means for transmitting a non-CD-SSB for a separate initial downlink BWP for RedCap UEs.

At block 1330, the method 1300 may include configuring an active downlink BWP for the RedCap UE including a paging search space. In some implementations, for example, the base station 102, the RX processor 370, or the controller/processor 375 may execute the RedCap BWP control component 120 or the active BWP component 830 to configure the active downlink BWP 570 for the RedCap UE including a paging search space 610. Accordingly, the base station 102, the RX processor 370, or the controller/processor 375 executing the RedCap BWP control component 120 or the active BWP component 830 may provide means for configuring an active downlink BWP for the RedCap UE including a paging search space.

At block 1340, the method 1300 may include transmitting a paging PDCCH indicating that system information has been updated. In some implementations, for example, base station 102, the TX processor 316, or the controller/processor 375 may execute the RedCap BWP control component 120 or the paging component 840 to transmit a paging PDCCH 612 indicating that system information has been updated. Accordingly, the base station 102, the TX processor 316, or the controller/processor 375 executing the RedCap BWP control component 120 or the paging component 840 may provide means for transmitting a paging PDCCH indicating that system information has been updated.

At block 1350, the method 1300 may include transmitting updated system information on the shared initial downlink BWP, the separate initial downlink BWP, or the active downlink BWP as indicated by the paging PDCCH. In some implementations, for example, base station 102, the TX processor 316, or the controller/processor 375 may execute the RedCap BWP control component 120 or the system information update component 850 to transmit updated system information 750 on the shared initial downlink BWP 430, the separate initial downlink BWP 450, or the active downlink BWP 470 as indicated by the paging PDCCH. Accordingly, the base station 102, the TX processor 316, or the controller/processor 375 executing the RedCap BWP control component 120 or the system information update component 850 may provide means for transmitting updated system information on the shared initial downlink BWP, the separate initial downlink BWP, or the active downlink BWP as indicated by the paging PDCCH.

Figure 14:
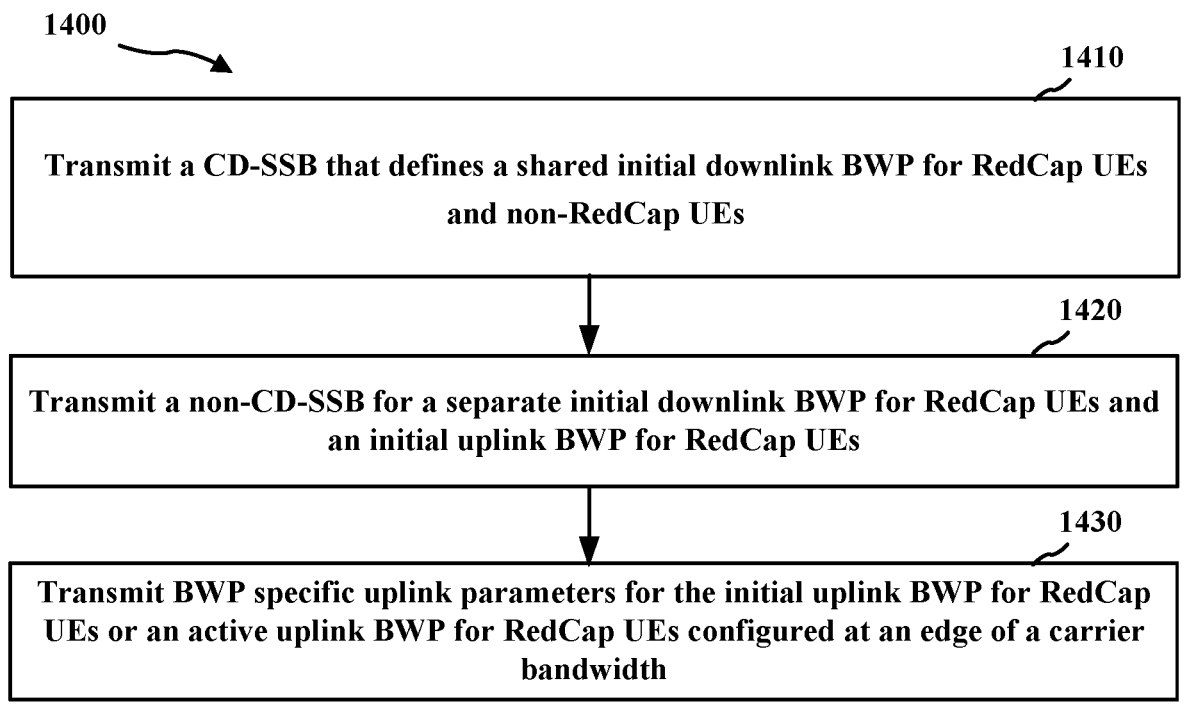
FIG. 14 is a flowchart of an example method for a BS to configure BWP-specific uplink parameters in a configuration with multiple BWPs.

FIG. 14 is a flowchart of an example method 1400 for a base station to control multiple BWPs for a RedCap UE. The method 1300 may be performed by a base station (such as the base station 102, which may include the memory 376 and which may be the entire base station 102 or a component of the base station 102 such as the RedCap BWP control component 120, the TX processor 316, the RX processor 370, or the controller/processor 375). The method 1000 may be performed by the RedCap BWP control component 120 in communication with the RedCap BWP component 140 of the UE 104.

At block 1410, the method 1400 may include transmitting a CD-SSB that defines a shared initial BWP for RedCap UEs and non-RedCap UEs. In some implementations, for example, the base station 102, the TX processor 316, or the controller/processor 375 may execute the RedCap BWP control component 120 or the shared initial BWP component 810 to transmit a CD-SSB that defines a shared initial BWP for RedCap UEs and non-RedCap UEs. Accordingly, the base station 102, the TX processor 316, or the controller/ processor 375 executing the RedCap BWP control component 120 or the shared initial BWP component 810 may provide means for transmitting a CD-SSB that defines a shared initial BWP for RedCap UEs and non-RedCap UEs.

At block 1420, the method 1400 may include transmitting a non-CD-SSB for a separate initial downlink BWP for RedCap UEs and an initial uplink BWP for RedCap UEs. In some implementations, for example, base station 102, the TX processor 316, or the controller/processor 375 may execute the RedCap BWP control component 120 or the separate initial BWP component 820 to transmit the non-CD-SSB 720 for a separate initial downlink BWP 450 for RedCap UEs and an initial uplink BWP 440 for RedCap UEs. Accordingly, the base station 102, the TX processor 316, or the controller/processor 375 executing the RedCap BWP control component 120 or the separate initial BWP component 820 may provide means for transmitting a non-CD-SSB for a separate initial downlink BWP for RedCap UEs and an initial uplink BWP for RedCap UEs.

At block 1430, the method 1400 may include transmitting BWP specific uplink parameters for the initial uplink BWP for RedCap UEs or an active uplink BWP for RedCap UEs configured at an edge of a carrier bandwidth. In some implementations, for example, the base station 102, the TX processor 316, or the controller/processor 375 may execute the RedCap BWP control component 120 or the uplink configuration component 860 to transmit BWP specific uplink parameters for the initial uplink BWP 440 for RedCap UEs or an active uplink BWP 460 for RedCap UEs configured at an edge of a carrier bandwidth 410. Accordingly, the base station 102, the TX processor 316, or the controller/processor 375 executing the RedCap BWP control component 120 or the uplink configuration component 860 may provide means for transmitting BWP specific uplink parameters for the initial uplink BWP for RedCap UEs or an active uplink BWP for RedCap UEs configured at an edge of a carrier bandwidth.

The following provides an overview of aspects of the present disclosure:

Aspect 1: A method comprising, at a reduced capability user equipment (RedCap UE): receiving a cell-defining synchronization signal block (CD-SSB) that defines a shared initial downlink bandwidth part (BWP) for RedCap UEs and non-RedCap UEs; switching to a separate initial downlink BWP for RedCap UEs; accessing a cell via the separate initial downlink BWP; receiving a configuration of an active downlink BWP for RedCap UEs; and determining whether to switch from the active downlink BWP to the shared initial BWP or the separate initial downlink BWP to obtain information.

Aspect 2: The method of Aspect 1, wherein the configuration of the active downlink BWP for RedCap UEs includes a paging search space, and wherein determining whether to switch to the shared initial BWP or the separate initial downlink BWP to obtain the information comprises receiving a paging physical downlink control channel (PDCCH) indicating that system information has been updated.

Aspect 3: The method of Aspect 2, wherein determining whether to switch to the shared initial BWP or the separate initial downlink BWP to obtain the information comprises switching from the active downlink BWP to the shared initial BWP or the separate initial downlink BWP to obtain updated system information.

Aspect 4: The method of Aspect 3, further comprising receiving an indication of whether the initial downlink BWP for obtaining the updated system information is the shared initial BWP or the separate initial downlink BWP.

Aspect 5: The method of Aspect 4, wherein the indication is one of: presence of system information in the separate initial downlink BWP, a radio network temporary identifier (RNTI) scrambling of a cyclic redundancy check (CRC) of the paging PDCCH, a BWP identifier in the paging PDCCH, a DMRS configuration of the paging PDCCH, or a paging occasion configuration of the paging PDCCH.

Aspect 6: The method of Aspect 2, wherein determining whether to switch to the shared initial BWP or the separate initial downlink BWP to obtain information comprises: decoding a broadcast or multicast physical downlink shared channel (PDSCH) carrying updated system information scheduled by the paging PDCCH on the active downlink BWP for RedCap UEs.

Aspect 7: The method of Aspect 6, wherein the paging PDCCH indicates the PDSCH on the active downlink BWP for RedCap UEs via one of a radio network temporary identifier (RNTI) scrambling of a cyclic redundancy check (CRC) of the paging PDCCH, a BWP identifier in the paging PDCCH, a DMRS configuration of the paging PDCCH, or a paging occasion configuration of the paging PDCCH.

Aspect 8: The method of Aspect 6 or 7, wherein the broadcast or multicast PDSCH is scrambled by a group radio network temporary identifier (RNTI), which is a function of a cell ID, BWP ID, or a group-common parameter.

Aspect 9: The method of any of Aspects 2-8, wherein the paging search space is jointly or separately configured with a wake-up signal search space.

Aspect 10: The method of any of Aspects 2-8, wherein the RedCap UE operates in half-duplex frequency domain duplexing (HD-FDD) on the active downlink BWP and receiving the paging search space is prioritized over uplink transmissions when paging occasions overlap with semi-static or dynamically configured uplink transmissions.

Aspect 11: The method of Aspect 1, wherein no paging search space is configured on the active downlink BWP for RedCap UEs and wherein determining whether to switch to the shared initial BWP or the separate initial downlink BWP to obtain information comprises switching to the separate initial downlink BWP to receive a paging PDCCH.

Aspect 12: The method of Aspect 11, further comprising switching to the shared initial BWP in response to the paging PDCCH indicating updated system information.

Aspect 13: The method of Aspect 11, further comprising receiving updated system information broadcast on the separate initial downlink BWP.

Aspect 14: The method of Aspect 11, further comprising receiving updated system information scheduled by the paging PDCCH on the separate initial downlink BWP.

Aspect 15: The method of any of Aspects 1-14, wherein determining whether to switch to the shared initial BWP or the separate initial downlink BWP to obtain information comprises determining whether to switch to perform measurements based on an indication of a measurement resource on one of the active downlink BWP, the separate initial downlink BWP, or the shared initial downlink BWP.

Aspect 16: The method of Aspect 15, wherein the measurement resource is one or more of a synchronization signal block (SSB), a channel state information reference signal (CSI-RS), or a positioning reference signal (PRS).

Aspect 17: The method of Aspect 15 or 16, wherein the measurements are layer 3 measurements including a reference signal received power (RSRP), a reference signal received quality (RSRQ), a signal to interference plus noise ratio (SINR), a signal to noise ratio (SNR), or a combination thereof.

Aspect 18: The method of any of Aspects 15-17, wherein the measurements include neighbor cell measurements based on system information of neighbor cells received in the configuration of the active downlink BWP for RedCap UEs.

Aspect 19: The method of any of Aspects 1-18, wherein the configuration of the active downlink BWP for RedCap UEs includes different measurement gaps to measure the CD-SSB of the shared initial downlink BWP and a non-CD-SSB of the separate initial downlink BWP.

Aspect 20: The method of Aspect 19, further comprising receiving an indication of an absolute transmit power of the CD-SSB of the shared initial downlink BWP and a differential transmit power of the non-CD-SSB of the separate initial downlink BWP.

Aspect 21: The method of any of Aspects 1-20, wherein determining whether to switch to the shared initial BWP or the separate initial downlink BWP to obtain information comprises determining a fallback BWP for RRC re-establishment or RRC release with redirection.

Aspect 22: The method of Aspect 21, wherein the fallback BWP is the shared initial downlink BWP.

Aspect 23: The method of Aspect 21, wherein determining a fallback BWP comprises receiving an indication that all neighbor cells transmit system information on the separate initial BWP for RedCap UEs, and wherein the fallback BWP is the separate initial downlink BWP.

Aspect 24: A method comprising, at a reduced capability user equipment (RedCap UE): receiving a cell-defining synchronization signal block (CD-SSB) that defines a shared initial downlink bandwidth part (BWP) for RedCap UEs and non-RedCap UEs; receiving a non-CD-SSB for a separate initial downlink BWP for RedCap UEs; and selecting one of the CD-SSB or the non-CD-SSB for transmitting a random access message based on system information received on the shared initial BWP or the separate initial BWP.

Aspect 25: The method of Aspect 24, wherein the selecting is based on system information received on the shared initial BWP or the separate initial BWP.

Aspect 26: The method of Aspect 25, wherein the selecting comprises selecting the CD-SSB for an initial transmission of the random access message.

Aspect 27: The method of Aspect 26, wherein the selecting further comprises: selecting the CD-SSB for a subsequent transmission of the random access message if a time for retransmission is less than a threshold; or selecting the non-CD-SSB for the subsequent transmission of the random access message if the time for retransmission is greater than or equal to the threshold.

Aspect 28: A method comprising, at a reduced capability user equipment (RedCap UE): receiving a cell-defining synchronization signal block (CD-SSB) that defines a shared initial downlink bandwidth part (BWP) for RedCap UEs and non-RedCap UEs; switching to a separate initial downlink BWP for RedCap UEs and an initial uplink BWP for RedCap UEs; and receiving BWP specific uplink parameters for the initial uplink BWP for RedCap UEs or an active uplink BWP for RedCap UEs, wherein the initial uplink BWP for RedCap UEs and the active uplink BWP for RedCap UEs are configured at an edge of a carrier bandwidth.

Aspect 29: The method of Aspect 28, wherein the BWP specific uplink parameters include one or more of: power control parameters, a frequency hopping flag, coverage enhancement parameters, or a waveform configuration for uplink channels.

Aspect 30: The method of Aspect 28 or 29, wherein receiving the BWP specific uplink parameters comprises receiving a configuration of the active uplink BWP for RedCap UEs.

Aspect 31: The method of Aspect 28 or 29, wherein receiving the BWP specific uplink parameters comprises receiving a BWP switching command.

Aspect 32: The method of Aspect 28 or 29, wherein receiving the BWP specific uplink parameters comprises receiving a system information update specific to RedCap UEs.

Aspect 33: A method of supporting a reduced capability user equipment (RedCap UE), comprising: transmitting a cell-defining synchronization signal block (CD-SSB) that defines a shared initial downlink bandwidth part (BWP) for RedCap UEs and non-RedCap UEs; transmitting a non-CD-SSB for a separate initial downlink BWP for RedCap UEs; configuring an active downlink BWP for the RedCap UE including a paging search space; transmitting a paging physical downlink control channel (PDCCH) indicating that system information has been updated; and transmitting updated system information on the shared initial downlink BWP, the separate initial downlink BWP, or the active downlink BWP as indicated by the paging PDCCH.

Aspect 34: The method of Aspect 33, further comprising transmitting an indication of whether the initial downlink BWP for obtaining the updated system information is the shared initial BWP or the separate initial downlink BWP.

Aspect 35: The method of Aspect 34, wherein the indication is one of: presence of system information in the separate initial downlink BWP, a radio network temporary identifier (RNTI) scrambling of a cyclic redundancy check (CRC) of the paging PDCCH, a BWP identifier in the paging PDCCH, a DMRS configuration of the paging PDCCH, or a paging occasion configuration of the paging PDCCH.

Aspect 36: The method of Aspect 33, wherein the paging PDCCH schedules a broadcast or multicast physical downlink shared channel (PDSCH) carrying updated system information on the active downlink BWP for RedCap UEs.

Aspect 37: The method of Aspect 36, wherein the paging PDCCH indicates the PDSCH on the active downlink BWP for RedCap UEs via one of a radio network temporary identifier (RNTI) scrambling of a cyclic redundancy check (CRC) of the paging PDCCH, a BWP identifier in the paging PDCCH, a DMRS configuration of the paging PDCCH, or a paging occasion configuration of the paging PDCCH.

Aspect 38: The method of Aspect 36 or 37, wherein the broadcast or multicast PDSCH is scrambled by a group radio network temporary identifier (RNTI), which is a function of a cell ID, BWP ID, or a group-common parameter.

Aspect 39: The method of any of Aspects 33-38, wherein the paging search space is jointly or separately configured with a wake-up signal search space.

Aspect 40: The method of Aspect 33, wherein no paging search space is configured on the active downlink BWP for RedCap UEs and wherein transmitting the updated system information comprises transmitting a paging PDCCH on the separate initial downlink BWP.

Aspect 41: The method of any of Aspects 33-40, further comprising transmitting an indication of measurement resource on one of the active downlink BWP, the separate initial downlink BWP, or the shared initial downlink BWP.

Aspect 42: The method of Aspect 41, wherein the measurement resource is one or more of a synchronization signal block (SSB), a channel state information reference signal (CSI-RS), or a positioning reference signal (PRS).

Aspect 43: The method of Aspect 41 or 42, wherein the measurements are layer 3 measurements including a reference signal received power (RSRP), a reference signal received quality (RSRQ), a signal to interference plus noise ratio (SINR), a signal to noise ratio (SNR), or a combination thereof.

Aspect 44: The method of any of Aspects 41-43, wherein the configuration of the active downlink BWP for the RedCap UE includes system information of neighbor cells to measure.

Aspect 45: The method of any of Aspects 33-44, wherein the configuration of the active downlink BWP for RedCap UEs includes different measurement gaps to measure the CD-SSB of the shared initial downlink BWP and a non-CD-SSB of the separate initial downlink BWP.

Aspect 46: The method of Aspect 45, further comprising transmitting an indication of an absolute transmit power of the CD-SSB of the shared initial downlink BWP and a differential transmit power of the non-CD-SSB of the separate initial downlink BWP.

Aspect 47: The method of any of Aspects 33-46, further comprising transmitting an indication that all neighbor cells transmit system information on the separate initial BWP for RedCap UEs, which is available as a fallback BWP for RRC re-establishment or RRC release with redirection.

Aspect 48: A method of supporting a reduced capability user equipment (RedCap UE), comprising: transmitting a cell-defining synchronization signal block (CD-SSB) that defines a shared initial downlink bandwidth part (BWP) for RedCap UEs and non-RedCap UEs; transmitting a non-CD-SSB for a separate initial downlink BWP for RedCap UEs and an initial uplink BWP for RedCap UEs; and transmitting BWP specific uplink parameters for the initial uplink BWP for RedCap UEs or an active uplink BWP for RedCap UEs, wherein the initial uplink BWP for RedCap UEs and the active uplink BWP for RedCap UEs are configured at an edge of a carrier bandwidth.

Aspect 49: The method of Aspect 48, wherein the BWP specific uplink parameters include one or more of: power control parameters, a frequency hopping flag, coverage enhancement parameters, or a waveform configuration for uplink channels.

Aspect 50: The method of Aspect 48 or 49, wherein transmitting the BWP specific uplink parameters transmitting receiving a configuration of the active uplink BWP for RedCap UEs.

Aspect 51: The method of Aspect 48 or 49, wherein transmitting the BWP specific uplink parameters comprises transmitting a BWP switching command.

Aspect 52: The method of Aspect 48 or 49, wherein transmitting the BWP specific uplink parameters comprises transmitting a system information update specific to RedCap UEs. Aspect 53: The method of any of Aspects 1-52, wherein a maximum bandwidth of the RedCap UE is lower than a maximum bandwidth of the non-RedCap UEs.

Aspect 54: An apparatus for wireless communication, comprising: a transceiver; a memory storing computer-executable instructions; and a processor coupled with the transceiver and the memory and configured to execute the computer-executable instructions to perform the method of any of Aspects 1-32.

Aspect 55: An apparatus for wireless communication, comprising: means for performing the method of any of Aspects 1-32.

Aspect 56: A non-transitory computer-readable medium storing computer executable code, the code when executed by a processor causes the processor to perform the method of any of Aspects 1-32.

Aspect 57: An apparatus for wireless communication, comprising: a transceiver; a memory storing computer-executable instructions; and a processor coupled with the transceiver and the memory and configured to execute the computer-executable instructions to perform the method of any of Aspects 33-52.

Aspect 58: An apparatus for wireless communication, comprising: means for performing the method of any of Aspects 33-52.

Aspect 59: A non-transitory computer-readable medium storing computer executable code, the code when executed by a processor causes the processor to perform the method of any of Aspects 33-52.

Aspect 60: A method comprising: receiving a cell-defining synchronization signal block (CD-SSB) that defines a shared initial downlink bandwidth part (BWP) for a first type of user equipment (UE) and a second type of UE having a maximum BWP size smaller than the first type of UE; switching to a separate initial downlink BWP for the second type of UE; accessing a cell via the separate initial downlink BWP; receiving a configuration of an active downlink BWP for the second type of UE; and determining whether to switch from the active downlink BWP to the shared initial BWP or the separate initial downlink BWP to obtain information.

Aspect 61: A method comprising: receiving a cell-defining synchronization signal block (CD-SSB) that defines a shared initial downlink bandwidth part (BWP) for a first type of user equipment (UE) and a second type of UE having a maximum BWP size smaller than the first type of UE; receiving a non-CD-SSB for a separate initial downlink BWP for the second type of UE; and selecting one of the CD-SSB or the non-CD-SSB for transmitting a random access message based on system information received on the shared initial BWP or the separate initial BWP.

Aspect 62: A method comprising: receiving a cell-defining synchronization signal block (CD-SSB) that defines a shared initial downlink bandwidth part (BWP) for a first type of user equipment (UE) and a second type of UE having a maximum BWP size smaller than the first type of UE; switching to a separate initial downlink BWP for the second type of UE and an initial uplink BWP for the second type of UE; and receiving BWP specific uplink parameters for the initial uplink BWP for the second type of UE or an active uplink BWP for the second type of UE, wherein the initial uplink BWP for the second type of UE and the active uplink BWP for the second type of UE are configured at an edge of a carrier bandwidth.

Aspect 63: A method, comprising: transmitting a cell-defining synchronization signal block (CD-SSB) that defines a shared initial downlink bandwidth part (BWP) for a first type of user equipment (UE) and a second type of UE having a maximum BWP size smaller than the first type of UE; transmitting a non-CD-SSB for a separate initial downlink BWP for a UE of the second type of UE; configuring an active downlink BWP for the UE including a paging search space; transmitting a paging physical downlink control channel (PDCCH) indicating that system information has been updated; and transmitting updated system information on the shared initial downlink BWP, the separate initial downlink BWP, or the active downlink BWP as indicated by the paging PDCCH.

Aspect 64: A method of supporting a user equipment (UE), comprising: transmitting a cell-defining synchronization signal block (CD-SSB) that defines a shared initial downlink bandwidth part (BWP) for a first type of UE and a second type of UE having a maximum BWP size smaller than the first type of UE; transmitting a non-CD-SSB for a separate initial downlink BWP for the second type of UE and an initial uplink BWP for the second type of UE; and transmitting BWP specific uplink parameters to the UE for the initial uplink BWP for the second type of UE or an active uplink BWP for the second type of UE, wherein the initial uplink BWP for the second type of UE and the active uplink BWP for the second type of UE are configured at an edge of a carrier bandwidth.

Aspect 65: The method of any of Aspects 59-64, wherein the maximum BWP size for the first type of UE is greater than or equal to a size of the shared initial downlink BWP.

Aspect 66: The method of any of Aspects 59-65, wherein the maximum BWP size for the second type of UE is less than a size of the shared initial downlink BWP.

Aspect 67: The method of Aspects 66, wherein the second type of UE only receives signaling on a control resource set (CORESET) of the shared initial downlink BWP.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication for a reduced capability (RedCap) user equipment (UE), comprising:
   a transceiver;
   a memory storing computer-executable instructions; and
   a processor coupled with the transceiver and the memory and configured to execute the computer-executable instructions to:
   receive a cell-defining synchronization signal block (CD-SSB) that defines a shared initial downlink bandwidth part (BWP) for RedCap UEs and non-RedCap UEs;
   switch to a separate initial downlink BWP for RedCap UEs based on system information for the separate initial downlink BWP indicated in the shared initial downlink BWP;
   access a cell via the separate initial downlink BWP;
   receive a configuration of an active downlink BWP for RedCap UEs; and
   determine whether to switch from the active downlink BWP to the shared initial BWP or the separate initial downlink BWP to obtain information.

2. The apparatus of claim 1, wherein the configuration of the active downlink BWP for RedCap UEs includes a paging search space, and wherein to determine whether to switch to the shared initial BWP or the separate initial downlink BWP to obtain the information, the processor is configured to receive a paging physical downlink control channel (PDCCH) indicating that system information has been updated.

3. The apparatus of claim 2, wherein to determine whether to switch to the shared initial BWP or the separate initial downlink BWP to obtain the information, the processor is configured to switch from the active downlink BWP to the shared initial BWP or the separate initial downlink BWP to obtain updated system information.

4. The apparatus of claim 2, wherein to determine whether to switch to the shared initial BWP or the separate initial downlink BWP to obtain the information, the processor is configured to decode a broadcast or multicast physical downlink shared channel (PDSCH) carrying updated system information scheduled by the paging PDCCH on the active downlink BWP for RedCap UEs.

5. The apparatus of claim 2, wherein the paging search space is jointly or separately configured with a wake-up signal search space.

6. The apparatus of claim 2, wherein the RedCap UE operates in half-duplex frequency domain duplexing (HD-FDD) on the active downlink BWP and receiving the paging search space is prioritized over uplink transmissions when paging occasions overlap with semi-static or dynamically configured uplink transmissions.

7. The apparatus of claim 1, wherein no paging search space is configured on the active downlink BWP for RedCap UEs and wherein to determine whether to switch to the shared initial BWP or the separate initial downlink BWP to obtain information, the processor is configured to switch to the separate initial downlink BWP to receive a paging PDCCH.

8. The apparatus of claim 1, wherein to determine whether to switch to the shared initial BWP or the separate initial downlink BWP to obtain information, the processor is configured to determine whether to switch to perform measurements based on an indication of a measurement resource on one of the active downlink BWP, the separate initial downlink BWP, or the shared initial downlink BWP.

9. The apparatus of claim 8, wherein the measurement resource is one or more of a synchronization signal block (SSB), a channel state information reference signal (CSI-RS), or a positioning reference signal (PRS).

10. The apparatus of claim 8, wherein the measurements are layer 3 measurements including a reference signal received power (RSRP), a reference signal received quality (RSRQ), a signal to interference plus noise ratio (SINR), a signal to noise ratio (SNR), or a combination thereof.

11. The apparatus of claim 8, wherein the measurements include neighbor cell measurements based on system information of neighbor cells received in the configuration of the active downlink BWP for RedCap UEs.

12. The apparatus of claim 1, wherein the configuration of the active downlink BWP for RedCap UEs includes different measurement gaps to measure the CD-SSB of the shared initial downlink BWP and a non-CD-SSB of the separate initial downlink BWP.

13. The apparatus of claim 1, wherein to determine whether to switch to the shared initial BWP or the separate initial downlink BWP to obtain information, the processor is configured to determine a fallback BWP for RRC re-establishment or RRC release with redirection.

14. A method comprising, at a reduced capability user equipment (RedCap UE):
   receiving a cell-defining synchronization signal block (CD-SSB) that defines a shared initial downlink bandwidth part (BWP) for RedCap UEs and non-RedCap UEs;
   switching to a separate initial downlink BWP for RedCap UEs based on system information for the separate initial downlink BWP indicated in the shared initial downlink BWP;
   accessing a cell via the separate initial downlink BWP;

receiving a configuration of an active downlink BWP for RedCap UEs; and determining whether to switch from the active downlink BWP to the shared initial BWP or the separate initial downlink BWP to obtain information.

15. The method of claim 14, wherein the configuration of the active downlink BWP for RedCap UEs includes a paging search space, and wherein determining whether to switch to the shared initial BWP or the separate initial downlink BWP to obtain the information comprises receiving a paging physical downlink control channel (PDCCH) indicating that system information has been updated.

16. The method of claim 15, wherein determining whether to switch to the shared initial BWP or the separate initial downlink BWP to obtain the information comprises switching from the active downlink BWP to the shared initial BWP or the separate initial downlink BWP to obtain updated system information.

17. The method of claim 14, wherein determining whether to switch to the shared initial BWP or the separate initial downlink BWP to obtain information comprises determining whether to switch to perform measurements based on an indication of a measurement resource on one of the active downlink BWP, the separate initial downlink BWP, or the shared initial downlink BWP.

18. The method of claim 17, wherein the measurement resource is one or more of a synchronization signal block (SSB), a channel state information reference signal (CSI-RS), or a positioning reference signal (PRS).

19. The method of claim 18, wherein the measurements are layer 3 measurements including a reference signal received power (RSRP), a reference signal received quality (RSRQ), a signal to interference plus noise ratio (SINR), a signal to noise ratio (SNR), or a combination thereof.

20. The method of claim 18, wherein the measurements include neighbor cell measurements based on system information of neighbor cells received in the configuration of the active downlink BWP for RedCap UEs.

21. The method of claim 14, wherein the configuration of the active downlink BWP for RedCap UEs includes different measurement gaps to measure the CD-SSB of the shared initial downlink BWP and a non-CD-SSB of the separate initial downlink BWP.

22. The method of claim 14, wherein determining whether to switch to the shared initial BWP or the separate initial downlink BWP to obtain information comprises determining a fallback BWP for RRC re-establishment or RRC release with redirection.

23. An apparatus for a base station to support a reduced capability user equipment (RedCap UE), comprising:
a transceiver;
a memory storing computer-executable instructions; and
a processor coupled with the transceiver and the memory and configured to execute the computer-executable instructions to:
transmit a cell-defining synchronization signal block (CD-SSB) that defines a shared initial downlink bandwidth part (BWP) for RedCap UEs and non-RedCap UEs;
transmit a non-CD-SSB for a separate initial downlink BWP for RedCap UEs based on system information for the separate initial downlink BWP indicated in the shared initial downlink BWP;
configure an active downlink BWP for the RedCap UE including a paging search space;
transmit a paging physical downlink control channel (PDCCH) indicating that system information has been updated; and
transmit updated system information on the shared initial downlink BWP, the separate initial downlink BWP, or the active downlink BWP as indicated by the paging PDCCH.

24. The apparatus of claim 23, wherein the processor is further configured to transmit an indication of measurement resource on one of the active downlink BWP, the separate initial downlink BWP, or the shared initial downlink BWP.

25. The apparatus of claim 24, wherein the measurement resource is one or more of a synchronization signal block (SSB), a channel state information reference signal (CSI-RS), or a positioning reference signal (PRS).

26. The apparatus of claim 24, wherein the measurements are layer 3 measurements including a reference signal received power (RSRP), a reference signal received quality (RSRQ), a signal to interference plus noise ratio (SINR), a signal to noise ratio (SNR), or a combination thereof.

27. The apparatus of claim 23, wherein the configuration of the active downlink BWP for the RedCap UE includes system information of neighbor cells to measure.

28. The apparatus of claim 23, wherein the configuration of the active downlink BWP for RedCap UEs includes different measurement gaps to measure the CD-SSB of the shared initial downlink BWP and a non-CD-SSB of the separate initial downlink BWP.

29. The apparatus of claim 23, further comprising transmitting an indication that all neighbor cells transmit system information on the separate initial BWP for RedCap UEs, which is available as a fallback BWP for RRC re-establishment or RRC release with redirection.

30. A method of supporting a reduced capability user equipment (RedCap UE), comprising:
transmitting a cell-defining synchronization signal block (CD-SSB) that defines a shared initial downlink bandwidth part (BWP) for RedCap UEs and non-RedCap UEs;
transmitting a non-CD-SSB for a separate initial downlink BWP for RedCap UEs based on system information for the separate initial downlink BWP indicated in the shared initial downlink BWP;
configuring an active downlink BWP for the RedCap UE including a paging search space;
transmitting a paging physical downlink control channel (PDCCH) indicating that system information has been updated; and
transmitting updated system information on the shared initial downlink BWP, the separate initial downlink BWP, or the active downlink BWP as indicated by the paging PDCCH.

* * * * *